(12) United States Patent  
Bertini

(10) Patent No.: US 7,611,748 B2  
(45) Date of Patent: Nov. 3, 2009

(54) METHOD FOR SELECTING FORMULATIONS TO TREAT ELECTRICAL CABLES

(75) Inventor: Glen John Bertini, Tacoma, WA (US)

(73) Assignee: Novinium, Inc., Coupeville, WA (US)

( * ) Notice: Subject to any disclaimer, the term of this patent is extended or adjusted under 35 U.S.C. 154(b) by 819 days.

(21) Appl. No.: 11/070,390

(22) Filed: Mar. 1, 2005

(65) Prior Publication Data

US 2005/0192708 A1    Sep. 1, 2005

Related U.S. Application Data

(60) Provisional application No. 60/549,262, filed on Mar. 1, 2004.

(51) Int. Cl.  
*B05D 5/12* (2006.01)

(52) U.S. Cl. .................. 427/117; 427/118; 427/120

(58) Field of Classification Search .......... 427/117, 427/118, 120; 29/858; 174/24, 25 R, 25 P, 174/68.1, 110 R, 120 R  
See application file for complete search history.

(56) References Cited

U.S. PATENT DOCUMENTS

| | | |
|---|---|---|
| 3,800,017 A | 3/1974 | Williams et al. |
| 3,956,420 A | 5/1976 | Kato et al. |
| 4,144,202 A | 3/1979 | Ashcraft et al. |
| 4,212,756 A | 7/1980 | Ashcraft et al. |
| 4,299,713 A | 11/1981 | Maringer et al. |
| 4,332,957 A | 6/1982 | Braus et al. |
| 4,372,988 A | 2/1983 | Bahder |
| 4,400,429 A | 8/1983 | Barlow et al. |
| 4,477,376 A | 10/1984 | Gold |
| 4,545,133 A | 10/1985 | Fryszczyn et al. |
| 4,608,306 A | 8/1986 | Vincent |
| 4,766,011 A | 8/1988 | Vincent et al. |
| 4,840,983 A | 6/1989 | Vincent |
| 4,870,121 A | 9/1989 | Bamji et al. |
| 5,115,950 A | 5/1992 | Rohr |

(Continued)

FOREIGN PATENT DOCUMENTS

EP    92309362.9    4/1993

OTHER PUBLICATIONS

U.S. Appl. No. 11/379,979, filed Apr. 24, 2006, Bertini.

(Continued)

*Primary Examiner*—Brian K Talbot  
(74) *Attorney, Agent, or Firm*—Davis Wright Tremaine LLP; George C. Rondeau, Jr.

(57) ABSTRACT

A method for selecting components for a mixture to be injected into an interstitial void volume adjacent to a central stranded conductor of an electrical cable segment having the central conductor encased in a polymeric insulation jacket to enhance the dielectric properties of the cable segment. The method includes selecting an anticipated operating temperature for the cable segment to be used in selecting the components for the mixture to be injected into the interstitial void volume of the cable segment and selecting a minimum desired time period to be used in selecting the compounds for the mixture to be injected during which the dielectric properties of the cable segment are to be enhanced by the mixture. Next, first, second and third components for the mixture are selected to provide the cable segment with a reliable life at the selected operating temperature spanning first, second and third time periods, respectively.

44 Claims, 10 Drawing Sheets

U.S. PATENT DOCUMENTS

| | | | |
|---|---|---|---|
| 5,279,147 | A | 1/1994 | Bertini et al. |
| 5,372,840 | A | 12/1994 | Kleyer et al. |
| 5,372,841 | A * | 12/1994 | Kleyer et al. ............... 427/117 |
| 5,907,128 | A | 5/1999 | Lanan et al. |
| 6,005,055 | A | 12/1999 | Dammert et al. |
| 6,162,491 | A * | 12/2000 | Bertini ....................... 427/117 |
| 6,350,947 | B1 | 2/2002 | Bertini et al. |
| 6,610,932 | B2 | 8/2003 | Van Den Berg et al. |
| 6,697,712 | B1 | 2/2004 | Bertini et al. |
| 7,195,504 | B2 | 3/2007 | Bertini et al. |
| 7,353,601 | B1 | 4/2008 | Bertini |
| 2002/0046865 | A1 | 4/2002 | Bertini et al. |
| 2005/0189130 | A1 | 9/2005 | Bertini et al. |
| 2005/0191910 | A1 | 9/2005 | Bertini et al. |
| 2007/0046668 | A1 | 3/2007 | Bertini |
| 2007/0169954 | A1 | 7/2007 | Bertini et al. |

OTHER PUBLICATIONS

U.S. Appl. No. 11/468,274, filed Aug. 29, 2006, Bertini et al.
U.S. Appl. No. 11/625,251, filed Jan. 19, 2007, Bertini et al.
Robert E. Treybal, Mass-Transfer Operations, Chapter 4 "Diffusion in Solids" pp. 88-103, McGraw-Hill Book Company, 1980.
Glen J. Bertini, UTILX Corp.; Recent Advancements in Cable Rejuvenation Technology; IEEE/PES 1999 Summer Meeting; Reliability Centered Maintenance, Jul. 21, 1999; 5 pgs.
C. Katz, B. Fryszczyn, M. Walker, B.S. Bernstein; Extending The Service Life of Ethylene Propylene Rubber Insulated Cables; IEEE Paper presented at ICC mtg; 1999-2000; 6 pgs.
Kim Jenkins, UTILX Corp.; Submarine Cable Rescued With Silicone-Based Fluid; Slide Presentation; USA; 18 pgs.
Premedia Business Magazines & Media Inc.; Submarine Cable Rescued With Silicone-Based Fluid; Transmission & Distribution World; Jul. 1, 1999; 4 pgs.; USA.
Glen J. Bertini, IEEE, UTILX Corp.; Enhancing the Reliability of Solid-dielectric Cables; 4 pgs.; Kent, Washington; USA.
R. Hudson & M. Crucitt; Salt River Project; SRP Enhance Reliability of Underground Disribution Cable; 4 pags.; http://www.tdworld.com/mag/power_srp_enhances_reliability/.
IEEE Power Engineering Society; Insulated Conductors Committee Meeting, Minutes of the 104th Meeting; Oct. 25-26, 1998; 4 pgs.; GB600565-GB600568; St. Petersburg, FLA;USA.
EPRI Secondary Cable Workshop; Extending the Life of Secondary Cables; May 6, 1998; 1 page; Charlotte, NC; USA.
East Grand Forks Case Study; 1997; 1 page; USA.
IEEE Power Engineering Society; The Importance of Diffusion and Water Scavenging in Dielectric Enhancement . . . ; Technical Paper Summaries; 7 pages.
Glen J. Bertini, Entergy Metro Case Study: Post-Treatment Lessons; ICC Meeting; Apr. 1997; Scottsdale, Arizona; USA.
Glen J. Bertini, Dow Corning Corp., Cliff Richardson, Hendrix Wire & Cable; Silicone Strand-Fill: A New Material and Process; Spring 1990 IEEE/PES ICC; 11 pgs.; Dearborn, MI.
A.L. McKean; Breakdown Mechanism Studies in Crosslinked Polyethylene Cable; IEEE Transactions on Power Apparatus and Systems, vol. PAS-95, No. 1; Jan./Feb. 1976; Yonkers, NY; USA.

* cited by examiner

Diffusion Coefficients f(T)

METHOD FOR SELECTING FORMULATIONS TO TREAT ELECTRICAL CABLES

BACKGROUND OF THE INVENTION

1. Field of the Invention

The present invention relates to a method for enhancing the dielectric strength of an electrical power cable and, more particularly, relates to an efficient and effective method for selecting formulations to treat electrical cable segments.

2. Description of the Related Art

Extensive networks of underground electrical cables are in place in many parts of the industrialized world. Such underground distribution offers great advantage over conventional overhead lines in that it is not subject to wind, ice or lightning damage and is thus viewed as a reliable means for delivering electrical power without obstructing the surrounding landscape, the latter feature being particularly appreciated in suburban and urban settings. Unfortunately, these cables, which generally comprise a stranded conductor surrounded by a semi-conducting shield, a layer of insulation jacket, and an insulation shield, often suffer premature breakdown and do not attain their originally anticipated longevity of 30 to 40 years. Their dielectric breakdown is generally attributed to at least two so-called "treeing" phenomena which lead to a progressive degradation of the cable's insulation. The first, "electrical treeing," is the product of numerous electrical discharges in the presence of strong electrical fields which eventually lead to the formation of microscopic branching channels within the insulation material, from which the descriptive terminology derives. A similar mechanism, "water treeing," is observed when the insulation material is simultaneously exposed to moisture and an electric field. Although the latter mechanism is much more gradual than electrical treeing, it does occur at considerably lower electrical fields and therefore is considered to be a primary contributor to reduced cable service life. Since replacing a failed section of underground cable can be a very costly and involved procedure, there is a strong motivation on the part of the electrical utility industry to extend the useful life of existing underground cables in a cost-effective manner.

Two early efforts by Bahder and Fryszczyn focused on rejuvenating in-service cables by either simply drying the insulation or introducing a certain liquid into the void volume associated with the conductor geometry after such a drying step. Thus, in U.S. Pat. No. 4,545,133 the inventors teach a method for retarding electrochemical decomposition of a cable's insulation by continuously passing a dry gas through the interior of the cable. Only nitrogen is explicitly recited as the gas to be used and maximum pressure contemplated for introducing the gas is 50 psig (pounds per square inch above atmospheric pressure). Not only is this method cumbersome, but it requires extensive monitoring and scheduled replenishment of the dry gas supply. U.S. Pat. No. 4,372,988 to Bahder teaches a method for reclaiming electrical distribution cable which comprises drying the cable and then continuously supplying a tree retardant liquid to the interior of the cable. The liquid was believed to diffuse out of the cable's interior and into the insulation, where it filled the microscopic trees and thereby augmented the service life of the cable. This disclosure suffers from the disadvantage that the retardant can exude or leak from the cable. The loss of liquid was addressed by a preferred embodiment wherein external reservoirs suitable for maintaining a constant level of the liquid were provided, further adding to the complexity of this method.

An improvement over the disclosure by Bahder was proposed by Vincent et al. in U.S. Pat. No. 4,766,011, wherein the tree retardant liquid was selected from a particular class of aromatic alkoxysilanes. Again, the tree retardant was supplied to the interstices of the cable conductor. However, in this case, the fluid can polymerize within the cable's interior as well as within the water tree voids in the insulation and therefore does not leak out of the cable, or only exudes therefrom at a low rate. This method and variations thereof employing certain rapidly diffusing components (see U.S. Pat. Nos. 5,372,840 and 5,372,841) have enjoyed commercial success over the last decade or so, but they still have some practical limitations when reclaiming underground residential distribution (URD) cables, which have a relatively small diameter, and therefore present insufficient interstitial volume relative to the amount of retardant required for optimum dielectric performance. Thus, although not explicitly required by the above mentioned disclosures, a typical in-the-field reclamation of URD cables employing such silane-based compositions typically leaves a liquid reservoir connected to the cable for a 60 to 90 day "soak period" to allow sufficient retardant liquid to penetrate the cable insulation and thereby restore the dielectric properties. For example, cables having round conductors smaller than 4/0 (120 mm$^2$) generally require the above described reservoir and soak period to introduce a sufficient amount of treating fluid. In reality, this is an oversimplification, since some cables larger than 4/0 with compressed or compacted strands would suffer from the same inadequate fluid supply. As a result, it is generally necessary to have a crew visit the site at least three times: first to begin the injection which involves a vacuum at one end and a slightly pressurized feed reservoir on the other end, second to remove the vacuum bottle a few days later after the fluid has traversed the length of the cable segment, and finally to remove the reservoir after the soak period is complete. The repetitive trips are costly in terms of human resource. Moreover, each exposure of workers to energized equipment presents additional risk of serious injury or fatality and it would be beneficial to minimize such interactions. In view of the above limitations, a circuit owner might find it economically equivalent, or even advantageous, to completely replace a cable once it has deteriorated rather than resort to the above restorative methods.

Unlike the above described URD systems, large diameter (e.g., feeder) cables present their own unique problems. Because of the relatively larger interstitial volumes of the latter, the amount of retardant liquid introduced according to the above described methods can actually exceed that required to optimally treat the insulation. Such systems do not require the above described reservoir, but, as the temperature of the treated cable cycles with electrical load, thermodynamic pumping of ever more liquid from the cable's core into the insulation was believed to be responsible for the catastrophic bursting of some cables. This "supersaturation" phenomenon, and a remedy therefor, are described in U.S. Pat. No. 6,162,491 to Bertini. In this variation of the above described methods, a diluent, which has a low viscosity, is insoluble in the insulation and is miscible with the retardant liquid, is added to the latter, thereby limiting the amount of retardant which can diffuse into the insulation. A methodology for determining the proper amount of the diluent for a given situation is provided. While this method may indeed prevent the bursting of large cables after treatment it does not take advantage of the extra interstitial volume by employing a diluent which is incapable of providing any benefit to the long-term dielectric performance of the insulation. Thus, this method does not take advantage of the large interstitial volume associated with such cables.

In all of the above recited methods for treating in-service cables, the retardant liquid is injected into the cable under a pressure sufficient to facilitate filling the interstitial void volume. But, although pressures as high as 400 psig have been employed to this end (e.g., Transmission & Distribution World, Jul. 1, 1999, "Submarine Cable Rescued With Silicone-Based Fluid"), the pressure is always discontinued after the cable is filled. At most, a residual pressure of up to 30 psig is applied to a liquid reservoir after injection, as required for the soak period in the case of URD cable reclamation. And, while relatively high pressures have been used to inject power cables, this prior use is solely to accelerate the cable segment filling time, especially for very long lengths as are encountered with submarine cables (the above Transmission & Distribution World article), and the pressure was relieved after the cable segment was filled. Furthermore, even when higher pressures were maintained in an experimental determination of possible detrimental effects of excessive pressure, the pressure was maintained for only a brief period by an external pressure reservoir to simulate the injection of longer segment lengths than those employed in the experiment ("Entergy Metro Case Study: Post-Treatment Lessons," Glen Bertini, ICC April, 1997 Meeting, Scottsdale, Ariz.). In this case, even after two hours of continuous pressure at 117 psig, the interstitial void volume of the cable segment was not completely filled and it was suggested that the inability to completely fill the interstices was due to severe strand compaction.

While injection to extend the life of power cables has been in wide-spread use for two decades, in each case a single active formulation (either an essentially pure compound or a mixture) is pumped into cables to extend life (see U.S. Pat. Nos. 4,372,988; 4,766,011; 5,372,840 and 5,372,841). While each of these prior art patents suggests that mixtures of materials might be efficacious, they do not suggest a method to optimize the total quantity and total concentration of each component in a mixture to match the unique geometry, condition, and anticipated operation of each cable. In some cases, where there are larger conductors with less severe compaction, there may be more interstitial volume available within the strand interstices than required to treat the cable. The prior art approach does disclose the addition of non-active dilutants to mitigate potential conditions of super saturation (see U.S. Pat. No. 6,162,491). But, in each and every case a single formulation of active ingredients is utilized.

BRIEF SUMMARY OF THE INVENTION

A method for selecting components for a mixture to be injected into an interstitial void volume adjacent to a central stranded conductor of an electrical cable segment having the central conductor encased in a polymeric insulation jacket to enhance the dielectric properties of the cable segment. The method includes selecting an anticipated operating temperature for the cable segment to be used in selecting the components for the mixture to be injected into the interstitial void volume of the cable segment; and selecting a minimum desired time period to be used in selecting the compounds for the mixture to be injected into the interstitial void volume of the cable segment during which the dielectric properties of the cable segment are to be enhanced by the mixture. Next, the method includes selecting a first component for the mixture to provide the cable segment with a reliable life at the selected operating temperature spanning a first time period; selecting a second component for the mixture to provide the cable segment with a reliable life at the selected operating temperature spanning a second time period at least in part extending beyond the first time period; and selecting a third component for the mixture to provide the cable segment with a reliable life at the selected operating temperature spanning a third time period at least in part extending beyond the second time period and beyond the minimum desired time period. In another aspect, a method is provided for making a mixture to be injected into the interstitial void volume of the cable segment including selecting the anticipated operating temperature and the minimum desired time period as noted above, and also selecting a desired quantity of the mixture to be injected into the interstitial void volume of the cable segment to at least fill the interstitial void volume, selecting first, second and third components for the mixture in first, second and third quantities, respectively, to produce at least the desired quantity of the mixture to be injected into the interstitial void volume, with: the first component for the mixture and the first quantity of the first component to be included in the mixture being further selected so as to provide the cable segment with a reliable life at the selected operating temperature spanning a first time period, the second component for the mixture and the second quantity of the second component to be included in the mixture being further selected so as to provide the cable segment with a reliable life at the selected operating temperature spanning a second time period at least in part extending beyond the first time period, and the third component for the mixture and the third quantity of the third component to be included in the mixture being further selected so as to provide the cable segment with a reliable life at the selected operating temperature spanning a third time period at least in part extending beyond the second time period and beyond the minimum desired time period. The method further including mixing the first, second and third quantities of the first, second and third components together.

Other features and advantages of the invention will become apparent from the following detailed description, taken in conjunction with the accompanying drawings.

BRIEF DESCRIPTION OF THE SEVERAL VIEWS OF THE DRAWING(S)

DETAILED DESCRIPTION OF THE INVENTION

Figure 1:
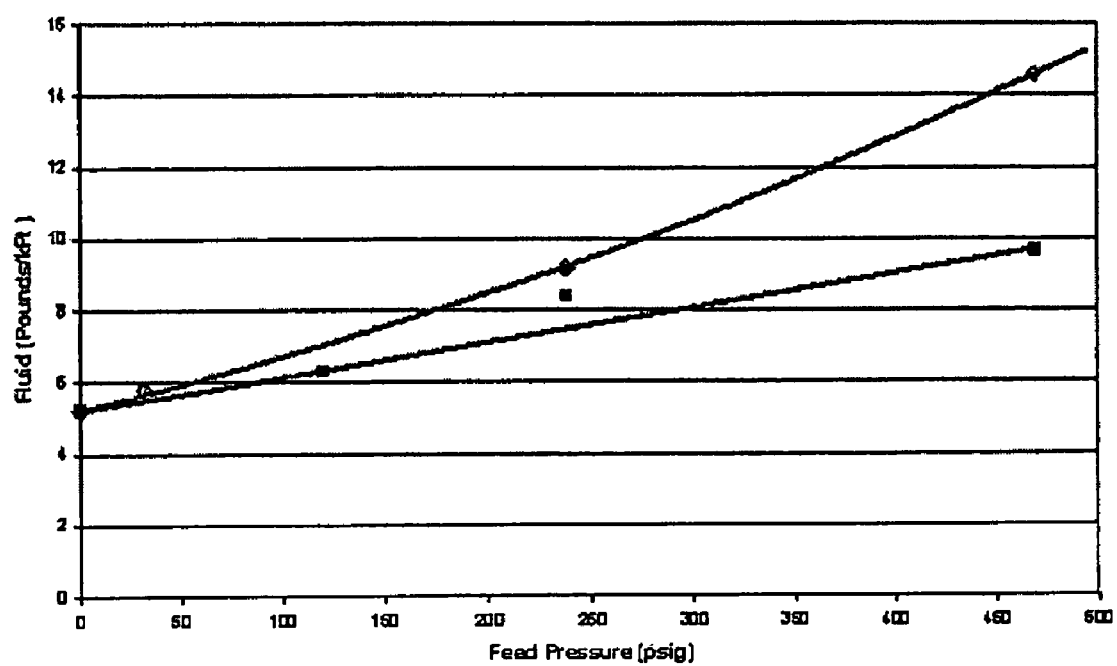
FIG. 1 is a plot of actual measured weight (top curve), and calculated weight (bottom curve), of acetophenone injected into a cable segment as a function of injection pressure, the respective weights being normalized to a 1000 foot cable length.

The present invention is directed to a method for selecting formulations to treat electrical cables. However, before discussing that method, an inventive method used for enhancing the dielectric properties of an in-service electrical power cable segment having a central stranded conductor, usually surrounded by a semi-conducting strand shield, and encased in a polymeric insulation, with an interstitial void volume in the region of the conductor, which is the preferred method for applying the formulations selected using the method of the present invention, will be discussed in detail. The method for enhancing the cable segment involves filling the interstitial void volume with at least one dielectric property-enhancing fluid at a pressure below the elastic limit of the polymeric insulation jacket, and subsequently confining the dielectric property-enhancing fluid within the interstitial void volume at a desirable sustained residual pressure imposed along the entire length of the cable segment and, again, below the elastic limit. The method for enhancing the cable segment exploits the discovery that, when the interstitial void volume of a cable segment is filled with a dielectric property-enhancing fluid and the fluid confined therein at a high residual pressure, the volume of fluid actually introduced significantly exceeds the volume predicted from a rigorous calculation of the cable's expansion at the imposed pressure. The difference between the observed and calculated volume change increases with pressure and is believed to be due mainly to the accelerated adsorption of the fluid in the conductor shield as well as transport thereof through the conductor shield and insulation of the cable. Thus, with sufficient residual sustained pressure, it is possible to expand the insulation jacket of an in-service cable segment in a manner that is so slight as to not cause any mechanical damage to the cable or to induce any untoward electrical effects, yet large enough to significantly increase the volume of dielectric property-enhancing fluid which can be introduced. As a result, and unlike the prior art, the present method does not require the above mentioned "soak" period, and the associated external pressure reservoir, to introduce a sufficient amount of fluid to effectively treat the cable segment. As used herein, the term "elastic limit" of the insulation jacket of a cable segment is defined as the internal pressure in the interstitial void volume at which the outside diameter of the insulation jacket takes on a permanent set at 25° C. greater than 2% (i.e., the OD increases by a factor of 1.02 times its original value), excluding any expansion (swell) due to fluid dissolved in the cable components. This limit can, for example, be experimentally determined by pressurizing a sample of the cable segment with a fluid having a solubility of less than 0.1% by weight in the conductor shield and in the insulation jacket (e.g., water), for a period of about 24 hours, after first removing any covering such as insulation shield and wire wrap, after the pressure is released, the final OD is compared with the initial OD in making the above determination. For the purposes herein, it is preferred that the above mentioned residual pressure is no more than about 80% of the above defined elastic limit.

The in-service cable segment to which the present methods discussed are generally applied is the type used in underground residential distribution and typically comprises a central core of a stranded copper or aluminum conductor encased in a polymeric insulation jacket. The strand geometry of the conductor defines an interstitial void volume. As is well known in the art, there is usually also a semi-conducting polymeric conductor shield positioned between the conductor and insulation jacket. However, this shield can also be of a high permittivity material sometimes utilized in EPR cables. Further, low voltage (secondary) cables do not employ such a shield. In addition, the cables contemplated herein often further comprise a semi-conducting insulation shield covering the insulation jacket, the latter being ordinarily wrapped with a wire or metal foil grounding strip and, optionally, encased in an outer polymeric, metallic, or combination of metallic and polymeric, protective jacket. The insulation material is preferably a polyolefin polymer, such as high molecular weight polyethylene (HMWPE), cross-linked polyethylene (XLPE), a filled copolymer or rubber of polyethylene and propylene (EPR), vinyl acetate or is a solid-liquid dielectric such as paper-oil. The base insulation may have compounded additives such as anti-oxidants, tree-retardants, plasticizers, and fillers to modify properties of the insulation. Medium voltage, low voltage and high voltage cables are contemplated herein. As used herein, the term "in-service" refers to a cable segment which has been under electrical load and exposed to the elements for an extended period. In such a cable, the electrical integrity of the cable insulation has generally deteriorated to some extent due to the formation of water trees, as described above. It is also contemplated, however, that the method discussed can be used to enhance the dielectric properties of a new cable as well as an in-service cable. For the purposes herein, "sustained pressure" indicates that the fluid is contained or trapped within a cable segment's interstitial void volume at the residual pressure after the pressurized fluid source is removed, whereupon the pressure decays only by subsequent permeation through the conductor shield and insulation, as described infra. The method for enhancing the cable segment to be first discussed teaches the relationship between pressure and the augmented injection volume under sustained residual pressure and demonstrates the feasibility of eliminating or reducing the soak phase on cables with small conductors.

The above observations were made as follows. Nominal 100 foot long coiled cable segments (1/0, 175 mil, XLPE; cross-linked polyethylene insulation) were injected with acetophenone at sustained pressures of 30, 60, 120, 240, and 480 psig (pounds per square inch, gage) while the segments were immersed in water at 30° C. using novel high-pressure terminal connectors described infra. At each pressure, the outside diameter (OD) of the insulation was measured and compared to the OD before the cable was pressurized (i.e., 0 psig). The changes in the OD were monitored at each cable end and four individual measurements (two orthogonal measurements on each end of each cable segment) were averaged at each pressure, the repeatability of each individual measurement being approximately +/−2 mils. These increases in OD were plotted as a function of pressure, but the theoretically expected linear relationship was not observed due to the relatively high error of OD measurement at low pressures. Therefore, the high pressure point (approximately 480 psig) was used to fit a rigorous equation relating OD change (deflection) to internal pressure of an annulus, the latter being a very close approximation of the cable's geometry (e.g., see Jaeger & Cook, Fundamentals of Rock Mechanics, $2^{nd}$ edition, p. 135) according to the following equations:

Lame's parameters $G := \frac{E}{2 \cdot (1+v)}$ $\quad G = 8.6 ksi$ $\lambda := \frac{E \cdot v}{(1+v) \cdot (1-2 \cdot v)}$ $\quad \lambda = 98 ksi$ Radial deflection at any radius with internal pressure only, Ref. Fundamentals of Rock Mechanics, Jaeger & Cook, 2nd Ed., p.135

$u(r) := \frac{-p_i \cdot a^2 \cdot r}{2 \cdot (\lambda + G) \cdot (b^2 - a^2)} - \frac{p_i \cdot a^2 \cdot b^2}{2 \cdot G \cdot (b^2 - a^2) \cdot r}$ wherein E is the elastic modulus and v is Poison's ratio for the cable insulation, u (r)=radial deflection at a given radius r, a=inner radius, b=outer radius, G=shear modulus, λ=Lame's parameter, $p_i$=pressure in the interstices, and "ksi" indicates units in kilo-pounds per square inch. The increase in OD at 480 psig was first determined to be approximately 9.1 mils (1 mil=1/1000 in.), or 1.2% of the initial OD of 0.78 in. The modulus E was adjusted so as to correspond to this measured OD deflection using the known value of v=0.46 for the insulation (E=19 kpsi). From this, the change of the inner diameter (ID) was calculated as 18.2 mil. A similar procedure was used to calculate the change in ID as a function of pressure. Thus, at 480 psig, the increase in ID created an incremental annular void volume between the conductor strands and the conductor shield which corresponds to the introduction of approximately 4.5 pounds of acetophenone per 1000 feet of cable beyond the amount this cable can accommodate at atmospheric pressure, the latter amount being about 5.2 pounds per 1000 feet including the negligible compressibility of acetophenone. The resulting hydraulic expansion translates into, e.g., an 87% increase in total void volume at 480 psig, and it alone could eliminate the soak phase required by the prior art methods for some cables having insufficient interstitial void volume (e.g., those having a ratio of $v_1$ to $v_2$ in Table 1 of U.S. Pat. No. 6,162,491 less than unity). The calculated increase in fluid accommodated as a function of applied pressure for the above cable, expressed in pounds/1000 feet (lb/kft) of cable and normalized to a specific gravity (SG) of 1.0, is represented by the lower curve of FIG. 1.

In a similar fashion, the actual total volume (weight) introduced into the cable as a function of pressure was determined as follows. A 107 foot length of the above mentioned I/O cable was fitted with the novel high-pressure connector, described infra, at each terminus. A fluid reservoir and positive displacement pump were attached to the first connector via a closable valve and acetophenone was injected into the cable until fluid was observed to flow from the opposite end while the cable was maintained at 30° C. in a water bath. At this point, a valve attached to the second connector was closed and pumping was continued until the pressure reached the desired level (e.g., the above mentioned 480 psig), at which time the valve on the first connector was shut to contain the pressurized fluid, this sequence taking approximately 15 to 30 minutes for each target pressure. The amount of fluid so injected into the interstitial void volume of the cable segment was determined by weighing the reservoir before and after injection as well as by noting the amount of fluid displaced by the pump, these two close measurements then being averaged. Of course, any possible leakage from the cable was ruled out. As above, this measurement was normalized to SG=1.0 for a 1000 foot cable to provide a basis for comparison of the various cables samples. Unexpectedly, the actual total amount of acetophenone which could be introduced into the interstitial void volume of the above cable at 480 psig was found to be considerably greater than the above geometrically predicted value of 87%. For example, when confined within the cable interior at 480 psig, the incremental amount of this fluid was 9.4 lb/kft greater than the zero pressure value of 5.2 lb/kft, or 180% of the zero-pressure interstitial volume (weight) and the total fluid accommodated was 5.2+9.4=14.6 lb/kft at 480 psig. It was verified that no leakage of fluid took place. Measurements at other pressures are represented by the upper curve of FIG. 1 (again normalized to SG=1.0), wherein the difference between the actual amount accommodated at a given pressure and the amount predicted from the above describe geometric calculations is termed the "Permeation-Adsorption Gap." This gap widened with increasing pressure over the range studied.

The effect of fluid compressibility can be readily estimated and largely discounted as insignificant in the above experiment. For example, the compressibility of benzene, a material similar to acetophenone, is $6.1 \times 10^{-6}$ ΔV/V·psi. At a nominal pressure of 480 psig, benzene would be compressed only about 0.3%. Thus, even fluids having high compressibility, such as silicones, would introduce no more than about 0.5 to 1% of additional fluid at the maximum pressures contemplated herein, an amount insignificant relative to the increases observed.

While not wishing to be limited to any specific mechanism, it is believed that the above described dramatic increase in effective interstitial void volume (or injection volume) is due, at least in part, to the heterogeneous and micro-porous nature of the conductor shield. This shield is typically a polyolefin polymer filled with 28-40% carbon black. Carbon black, which is added primarily to impart semi-conducting properties to the conductor shield, contains microscopic surface irregularities which make it an excellent adsorption surface for the dielectric property-enhancing fluid. It is believed that fluids injected at high pressure essentially flow through these microscopic surfaces and channels faster than if they were injected at a lower pressure. Further it is believed that a substantial portion of the fluid can be reversibly adsorbed onto the carbon black surface (i.e., into the conductor shield), thereby providing another reservoir to store the dielectric property-enhancing fluid.

Besides the advantage of creating a larger "internal reservoir," one skilled in the art would recognize another advantage of this rapid radial transport through the conductor shield. Rapid delivery of dielectric property-enhancing fluid to the conductor shield/insulation interface where dielectric degradation has occurred is a desirable outcome not enjoyed by the prior art approaches. Rapid increase of dielectric performance is critical for good reactive injection performance (i.e., treatment after a cable failure). As discussed above, the elevated injection pressures occasionally utilized in the prior art are released as soon as the fluid reaches the far end of the cable segment being injected. Using this conventional mode of operation, the segment end adjacent to the pressure source receives a small benefit, but the distal end receives no benefit since it remains at near ambient pressure throughout the injection process. By analogy to a chain which fails at its weakest link, any restoration process which does not benefit the whole cable segment provides virtually no benefit since a cable failure anywhere along the length causes the entire length to become non-functional. Again, the low to moderate pressures used in the art today (10-350 psig) are lower than the maximum pressures contemplated by the present method (i.e., up to about 1000 psig) and, most significantly, are bled to near zero (e.g., nominal soak pressure less than 30 psig and more typically less than 10 psig, using an external reservoir) after the fluid has flowed the length of the cable. Thus, for example, while the above mentioned I/O cable segment having a length of 100 to 300 feet can be injected in only about 10 to 30 minutes to raise the interstitial pressure throughout to 480 psig, the present method holds such pressures throughout the entire cable length for days, or weeks, or months after the injection is complete.

Another advantage of the method for enhancing the cable segment first being discussed is that it accelerates the diffusion of the dielectric property-enhancing fluid through the insulation jacket of the cable segment, this being verified as follows. In a manner similar to the above described experiments, three identical I/O cable segments having lengths ranging from approximately 105.5 to 107 feet were injected with acetophenone at 30, 240, and 480 psig at 30° C. After the cables were filled, pressure was maintained for 30 minutes to simulate a typical injection condition contemplated by the present method. After the 30 minute interval, the fluid feed was terminated by closing a valve at the feed point to the cable and the respective pressure was allowed to decay with time as fluid permeated out of the interstitial volume and into the conductor shield and insulation (but not by leaking from the connectors). The results of that pressure decay for only the two higher pressures are plotted in the FIG. 2, the decay for the 30 psig cable being very rapid and reaching approximately 0 psig within about one day. Again, while not wishing to be constrained by any particular theory, it is believed that the initial rapid decrease of pressure, which was more rapid with greater applied pressure, results from the transport of fluid from the interstices into the conductor shield. After this rapid, initial phase, and as the conductor shield becomes saturated with the fluid, the pressure decays at a considerably reduced rate. This phase is believed to be due to the permeation of additional fluid out of the interstitial void volume and into the insulation.

Figure 3:
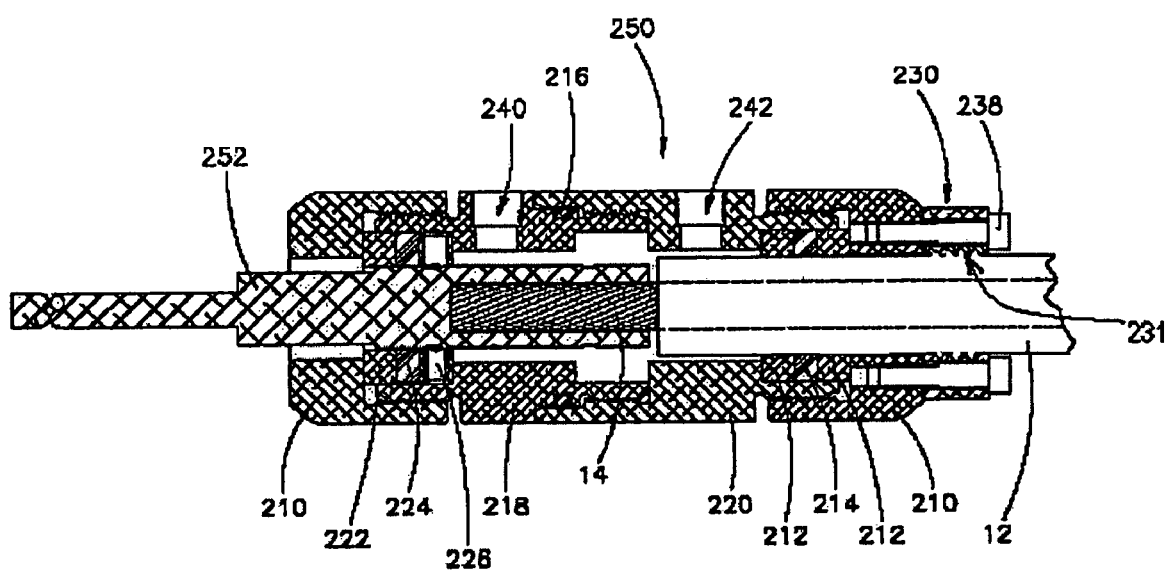
FIG. 3 is a cross-sectional view of a high-pressure terminal connector used to inject acetophenone into the cable segment of FIG. 1.
Figure 3A:
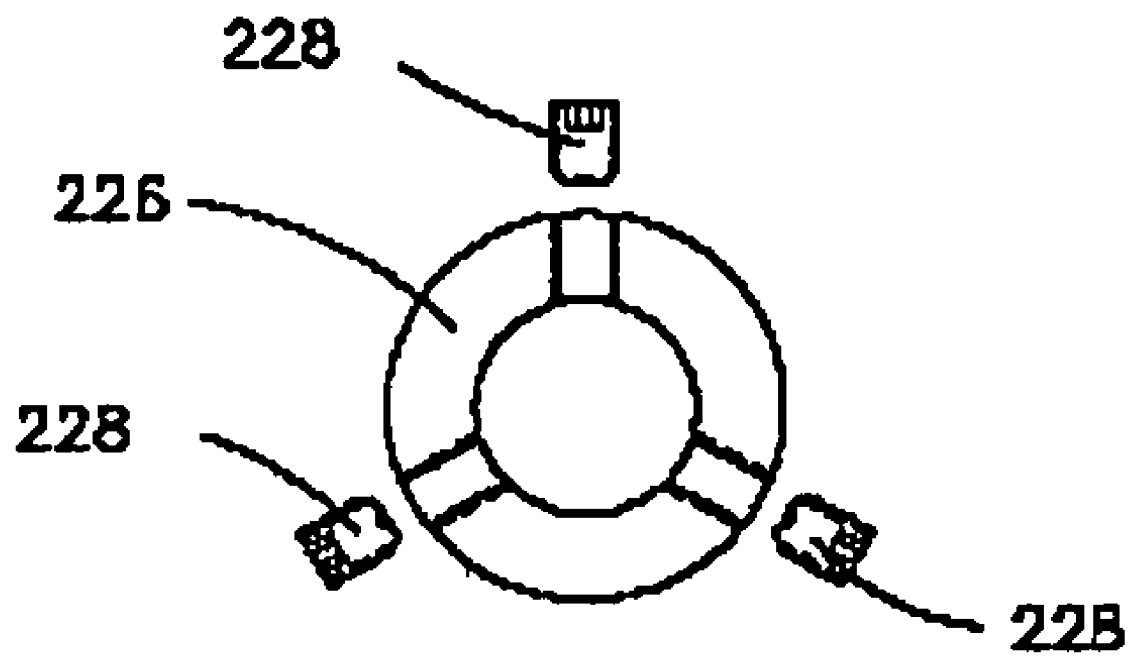
FIG. 3A is plan view of the washer of FIG. 3 and associated set-screws.

In the above experiments, the novel high-pressure connector 250, shown in cross-sectional view in FIG. 3, was used to fill the test cables at elevated pressure. In a typical assembly and test procedure, the cable termination was prepared by cutting back the outermost layers of the I/O cable to expose insulation jacket 12, per the manufacture's recommendations. Likewise, insulation jacket 12 and associated conductor shield (not shown) were cut back slightly beyond the manufacturer's requirements to expose stranded conductor 14 and assure that there was at least a 0.25 inch gap between termination crimp connector 252 and the wall of insulation jacket 12 after termination crimp connector 252 was crimped to the conductor 14. After the crimping procedure was complete, a first threaded cap 210 was installed over the insulation jacket 12 followed by first aluminum washer 212, rubber washer 214, and a second aluminum washer 212. The cable-side threaded housing 220 was then loosely threaded onto the already installed first threaded cap 210 at the right side of high-pressure terminal connector 250. The rubber O-ring 216 was installed in a groove of the termination-side threaded housing 218 and the latter was, in turn, threaded onto the cable-side threaded housing 220 until the external gap between the two housing components was essentially closed. It should be apparent to someone with ordinary skill that housings 218 and 220 could be reversed in the above description with no impact. An aluminum washer 226, having associated set screws 228 and illustrated in detail in FIG. 3A, was slid into position so as to reside over the smooth surface of termination crimp connector 252. While the assembly up to this point was slid slightly toward the cable side, two or three set screws were engaged so that aluminum washer 226 was immobilized with respect to the termination crimp connector 252. The position was chosen so that the rubber washer 224, which was added next, fell squarely on the un-crimped cylindrical surface of termination crimp connector 252 when the assembly was completed. At this point, the partially assembled high-pressure connector could be slid back toward the termination side to the position shown in FIG. 3. Aluminum washer 222 was placed adjacent to the rubber washer 224, a second threaded cap 210 was mated with the termination-side threaded housing 218 and threaded tightly thereto. The resulting compression provided sufficient force to deform rubber washer 224 to make a fluid-tight seal with respect to termination crimp connector 252 and the inside diameter of the termination-side threaded housing 218. The threads on the cable-side housing 220 were then tightened firmly such that the rubber washer 214 was compressed between the two aluminum washers 212, the compression providing sufficient force to deform rubber washer 214 to make a fluid-tight seal with respect to the surface of insulation jacket 12 and the inner peripheral surface of the cable-side threaded housing 220.

Figure 4:
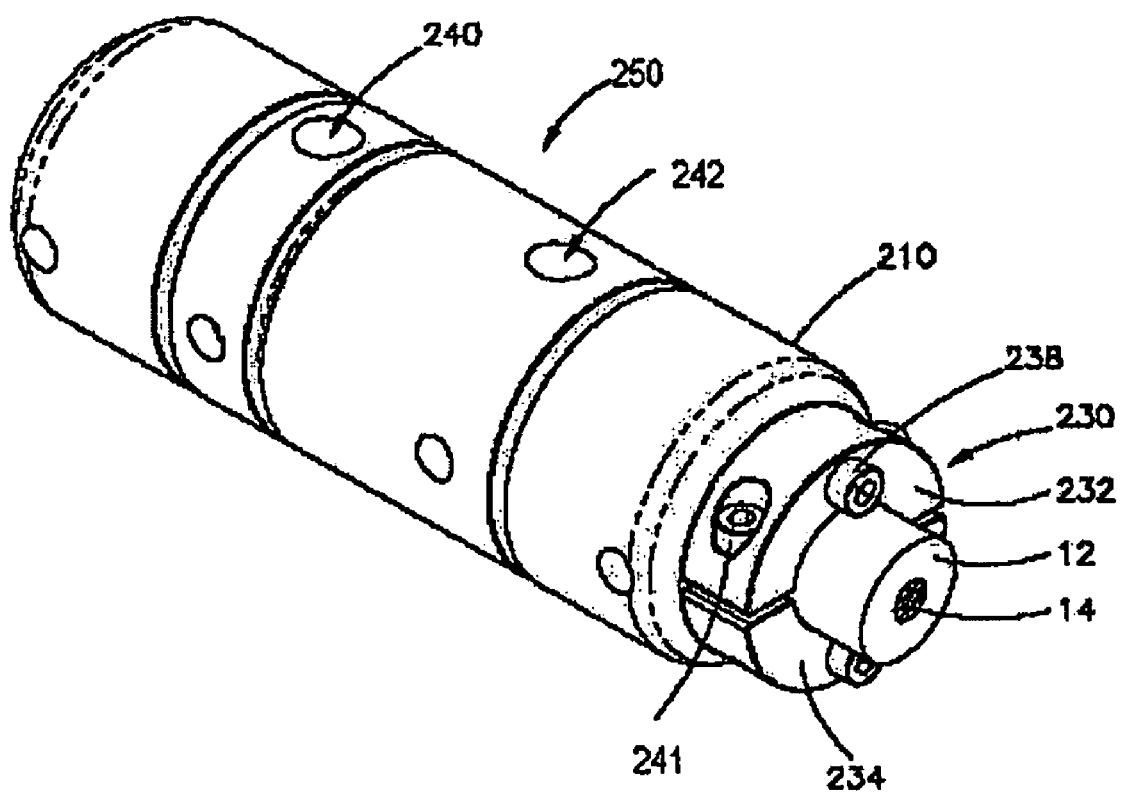
FIG. 4 is a perspective view of the assembled connector of FIG. 3 showing use of a split ring collar.

A split ring clamping collar 230, comprising two halves 232 and 234, each half having course internal threads 231 for engaging and grasping insulation jacket 12, was placed in the approximate position shown in FIG. 3 and in perspective view in FIG. 4. A hose clamp was used to temporarily hold the two halves of the collar 230 in place while two clamping collar bolts 238 were inserted and threaded into the first threaded cap 210 and partially tightened. The hose clamp was then removed and two clamping collar chord bolts 241 were screwed tightly into place to permanently join the two halves 232 and 234 of clamping collar 230, and collar bolts 238 were then completely tightened. As a result, the rough threads 231 disposed on the inner diameter of collar 230 partially penetrated or deformed the surface of insulation 12 so as to provide resistance to axial movement of connector 250 relative to the insulation jacket 12 of the cable segment to be injected under pressure. It was previously determined that, without such a means for securing the insulation jacket to the high-pressure connector, a "pushback" phenomenon resulted. Pushback is defined herein as the axial movement or creep of the insulation jacket and conductor shield away from the cut end (crimped end) of the conductor of a cable segment when a fluid is confined within its interstitial void volume at a high residual pressure. Ultimately, this pushback phenomenon resulted in sufficient displacement of the insulation jacket 12 relative to the above described compression seal 212/214/212 to cause fluid to leak from the connection and the high residual pressure to quickly collapse, thereby destroying the intent of the instant method. Acetophenone was then injected or withdrawn through one of the threaded injection ports 240 or 242 using an NTP to tube fittings well known in the art, as described above. The unused threaded injection port was plugged with a threaded plug (not shown). The inventor of the instant application developed the above-described high-pressure power cable connector and other connectors for use with the method for treating electrical cables at sustained elevated pressure described herein Such high-pressure connectors are described in detail in Provisional patent application Method for Treating Electrical Cable at Sustained Elevated Pressure, Ser. No. 60/549,322, filed Mar. 1, 2004 and a Nonprovisional patent application entitled High-Pressure Power Cable Connector filed concurrently herewith, which are incorporated herein by reference in their entirety.

The actual permeation rate of a dielectric property-enhancing fluid through the insulation jacket is dependent on the fluid pressure in the cable interstices and rapid increases in dielectric performance can be imparted with higher, sustained pressures. To illustrate this benefit according to the present method, the following dielectric property-enhancing fluid mixtures were prepared: FLUID 1=25% (weight) acetophenone +75% (weight) p-tolylethylmethyldimethoxysilane; FLUID 2=25% (weight) acetophenone +75% (weight) vinylmethylbis(1-phenylethyleneoxy)silane (i.e., methylvinyl bis (1-phenyl ethenyloxy)silane). Using the novel high-pressure connectors, described above, each fluid mixture was injected into the interstitial void volume of a 220-foot coiled segment of 1/0, 175 mil XLPE cable at 480 psig, and contained therein without leaking, according to the present method. This cable had been previously aged several years in an ambient temperature water tank while a voltage of $2.5U_0$(i.e., 2.5 X rated voltage) was applied thereto. The coils were immersed in a water bath at a controlled temperature of 25° C. After injection, but while the latent pressure was maintained on the coils by suitable injection devices and valving, a voltage of 21.65 kV (i.e., 2.5 X rated voltage) was applied. After 7 days, each cable was removed from the water bath and promptly cut into 6 samples for AC breakdown testing according to ICEA S-97-682-2000 10.1.3 "High Voltage Time Test Procedure," wherein the key test parameters were: 49-61 Hz, room temperature, 100 v/mil for 5 minutes raised in 40 v/mil increments each 5 minutes to failure. Before treatment, a third identically aged sample was sacrificed to establish the baseline performance for the laboratory aged cable. The results of testing were plotted on Weibull graphs. The 63.3% probability breakdown value increased from 370 volts/mil for the aged cable to 822 volts/mil for the segment treated with FLUID 1 (i.e., a 2.22 fold or 122% improvement over the control). Similarly, the 63.3% probability breakdown value increased from 370 volts/mil (control) to 999 volts/mil for the segment treated with FLUID 2 (i.e., a 2.7 fold or 170% improvement over the control). In each case, the 90% confidence bounds for the Weibull curves were quite narrow at the 63.3% industry recognized standard. These results stand in sharp contrast to a very similar experiment using the prior art approach (see above cited "Entergy Metro Case Study") wherein Cable-CURE®/XL fluid was injected into a 25kV, 750 kcmil cable at pressures of 30 and 117 psig. CableCURE/XL fluid is described in U.S. Pat. No. 5,372,841 and an MSDS sheet as a mixture of 70% phenylmethyldimethoxysilane (which has a diffusion coefficient of $5.73 \times 10^{-8}$ cm$^2$/ sec at 50° C. ) and 30% trimethylmethoxysilane (which has a diffusion coefficient of $2.4 \times 10^{-7}$ cm$^2$/ sec at 50° C.) and is thus analogous to the above fluid mixtures with respect to the relative concentrations of rapidly diffusing components and slower diffusing components as well as the absolute values of the diffusion coefficients of the former. In this study, the reported 63% breakdown value of the treated cables relative to control increased only 14.5% and 34.6% in seven days for the 30 psig and 117 psig treated cables, respectively. It is thus seen that, in absolute terms, the present method using the average performance of the above restorative fluid mixtures provides a (822+999)/2−370=541 volts/mil improvement. At best, this prior art employing a non-sustained pressure treatment provided an improvement of 74.7 kV / 262 mil−55.5 kV/ 262=285−212=73 volts/mil, wherein 262 mils is the thickness of the 25 kV cable's insulation. Put another way, the present method provides an improvement of at least about 640% over the old technology with respect to AC breakdown performance over a one week period.

In one embodiment of the method for enhancing the cable segment first being discussed, the interstitial void volume of a cable segment is injected (filled) with at least one dielectric property-enhancing fluid. As used herein with respect to the methods being discussed, a cable segment is generally either a length of continuous electrical cable extending between two connectors used in the injection of one or more dielectric property-enhancing fluid into the length of cable therebetween, or a length of electrical cable extending between two such connectors with one or more splice or other style connectors therebetween operation in a flow-through mode. The actual pressure used to fill the interstitial void volume is not critical provided the above-defined elastic limit is not attained. After the desired amount of the fluid has been introduced, the fluid is confined within the interstitial void volume at a sustained residual pressure greater than 50 psig using the aforementioned two connectors defining the cable segment, but below the elastic limit of the insulation jacket. It is preferred that the residual pressure is between about 100 psig and about 1000 psig, most preferably between about 300 psig and 600 psig. Further, for the method for enhancing the cable segment first being discussed, it is preferred that the injection pressure is at least as high as the residual pressure to provide an efficient fill of the cable segment (e.g., 550 psig injection and 500 psig residual). In another embodiment thereof, the residual pressure is sufficient to expand the interstitial void volume along the entire length of the cable segment by at least 5%, again staying below the elastic limit of the polymeric insulation jacket. Optionally, the dielectric property-enhancing fluid may be supplied at a pressure greater than about 50 psig for more than about 2 hours before being contained in the interstitial void volume.

In another embodiment, the method for enhancing the cable segment first being discussed may be applied to a cable segment having a first closable high-pressure connector attached at one terminus thereof and a second closable high-pressure connector attached at the other terminus thereof, each connector providing fluid communication with the interstitial void volume of the segment. Each connector employs an appropriate valve to open or close an injection port, as further described below. A typical sequence comprises initially opening both valves and introducing at least one dielectric property-enhancing fluid via the port of the first connector so as to fill the interstitial void volume of the segment. At this point, the valve of the second connector is closed and an additional quantity of the fluid is introduced via the port of the first connector under a pressure P greater than 50 psig. Finally, the valve of the first connector is closed so as to contain the fluid within the void volume at a residual pressure essentially equal to P.

Figure 2:
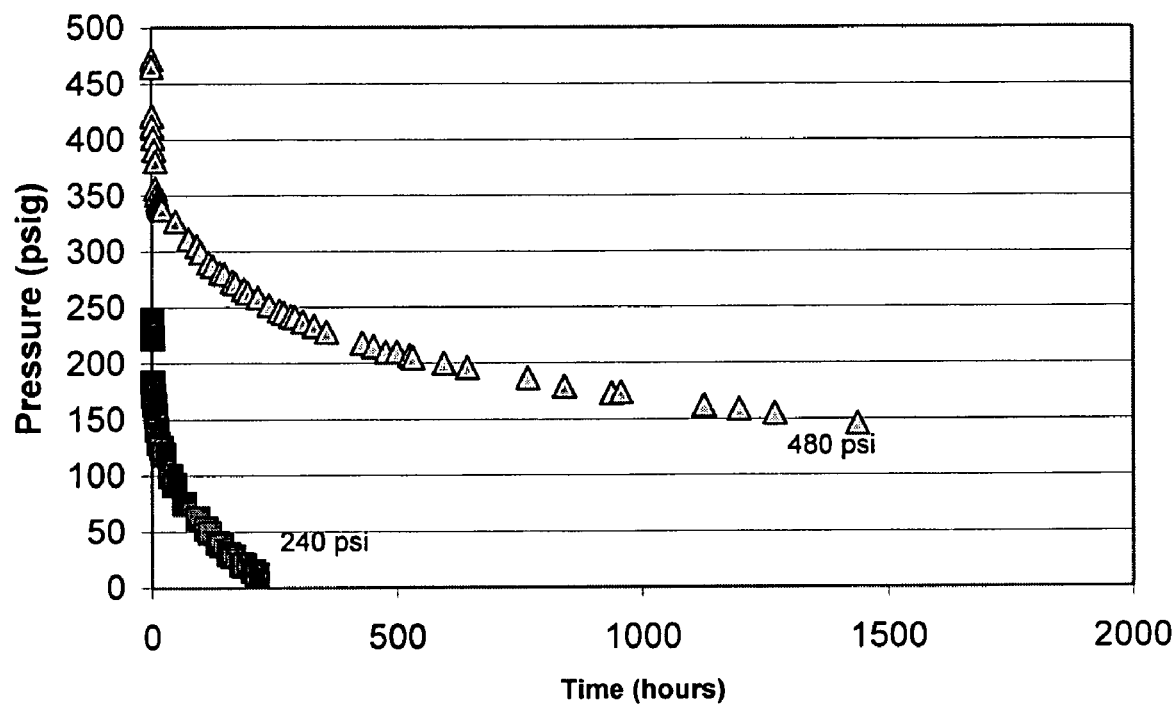
FIG. 2 is a plot of the pressure decay observed as a function of time after the cable segment of FIG. 1 was filled and the acetophenone confined under the indicated pressures.

Regardless of any particular embodiment, it is preferred that the dielectric property-enhancing fluid be selected such that the residual pressure decays to essentially zero psig in greater than 2 hours, but preferably in more than 24 hours, and in most instances within about two years of containing the fluid, as discussed supra with respect to FIG. 2. Furthermore, since the instant method can supply an additional increment of fluid to the interstitial void volume, it is also contemplated the method can be used to advantage to treat cable segments wherein the weight of the dielectric property-enhancing fluid corresponding to the interstitial void volume is less than the weight of the fluid required to saturate the conductor shield and the insulation jacket of the segment (i.e., a desirable amount for optimal treatment). Thus, the method for enhancing the cable segment first being discussed is particularly advantageous when applied to the treatment of round or concentric stranded cables having a size of no greater than the above mentioned 4/0 (120 mm$^2$), of compressed stranded cables having a size of no greater than 250 kcm (225 mm$^2$), and of compact stranded cables having a size of no greater than 1000 kcm (500 mm$^2$).

In view of the above mentioned pushback phenomenon, special connectors which are appropriately secured to the insulation jacket of the cable are preferably used to facilitate the instant method. Such connectors, as exemplified by the above described high-pressure terminal connector of FIG. 3 and further described below, employ either external or integral valves which allow fluid to be introduced into the cable segment as well as confined at the residual high pressure. Such a valve can also serve to withdraw water and/or contaminated fluid from the other, remote end of the cable segment. For example, in the connector shown in FIG. 3, at least one injection port is fitted with an external quick-disconnect coupling such that, after injection, the pressurized fluid supply can be readily disconnected and the injected fluid trapped within the connector housing and the interstitial volume of the cable at a residual pressure P throughout the entire length of the cable segment being treated. It is preferred that miniaturized versions of conventional quick-disconnect couplings are used and that these fit essentially flush with the outer surface of the housing to provide a protrusion-free or low profile outer surface for the high-pressure splice connector to readily receive subsequent insulation component(s) and avoid any sharp electrical stress concentration points. Other preferred high-pressure connectors which may advantageously be utilized in the practice of the present method are described below with reference to the drawings illustrating exemplary embodiments thereof, wherein the same reference numerals are applied to identical or corresponding elements.

Figure 5:
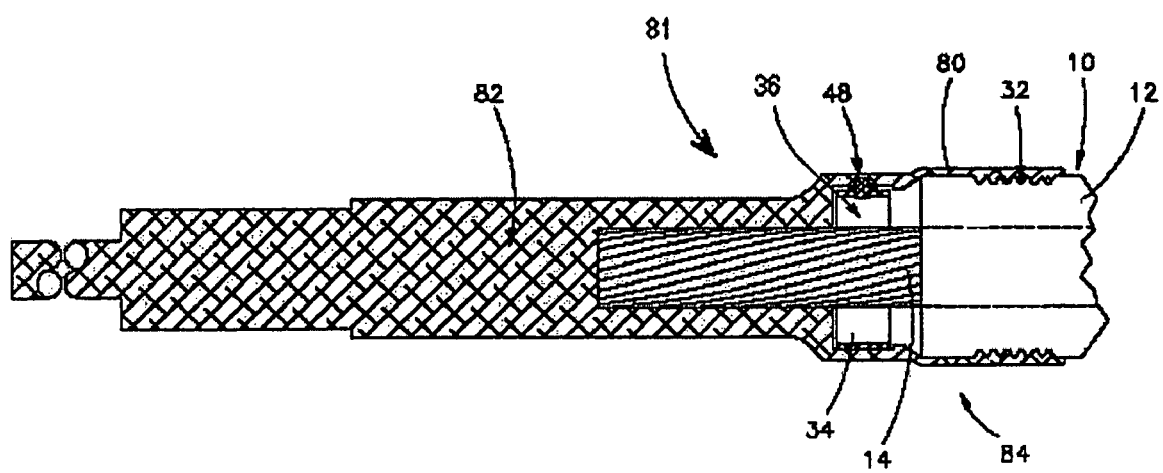
FIG. 5 is a partial cross-sectional view of a swagable high-pressure, integral housing terminal connector having machined teeth in the swaging regions.

A swagable high-pressure terminal connector 81 which may be used in the instant method is shown in FIG. 5. The housing 80, having internal machined teeth 32, is sized so that its ID (inner diameter) is just slightly larger than the OD (outer diameter) of insulation jacket 12 and is configured to receive the end portion of cable segment 10 therein. Housing 80 is integral with a termination crimp connector portion 82. In application, the termination crimp connector portion 82 is crimped to conductor 14 of cable 10 at an overlapping region to secure it thereto and provide electrical communication therewith. Housing 80, further comprises a self closing spring-actuated valve 36 (illustrated in enlarged detail in FIG. 6) disposed at injection port 48 for introduction of the dielectric property-enhancing fluid. After housing 80 is placed in the position shown in FIG. 5, a swage is applied to the periphery of housing 80 over circumferential teeth 32 such that teeth 32 deform and partially penetrate insulation jacket 12 along a periphery thereof sufficiently so as to simultaneously form a fluid-tight seal against the insulation jacket and prevent pushback (as described above) of the insulation jacket when the cable segment is subjected to sustained interior pressure.

As used herein, swaging or "circumferential crimping" refers to the application of radial, inwardly directed compression around the periphery of the housing over at least one selected axial position thereof. This swaging operation produces a circular peripheral indented region (e.g., a groove or flat depression) on the outer surface of the housing and inwardly projects a corresponding internal surface thereof into the insulation jacket (or bushing or splice crimp connector) so as to partially deform the latter at a periphery thereof. Swaging can be accomplished by methods known in the art, such as a commercially available CableLok™ radial swaging tool offered by Deutsch Metal Components, Gardena, Calif. Swaging is to be distinguished from a normal crimping operation, wherein one-point (indent crimp), two-point or multi-point radial crimps are applied to join crimp connectors using tools well known in the art (e.g., the crimp connectors attached to the conductor). The resulting crimp from such a single or multi-point crimping operation is referred to simply as "crimp" herein and may be accomplished with shear bolts.

Figure 6:
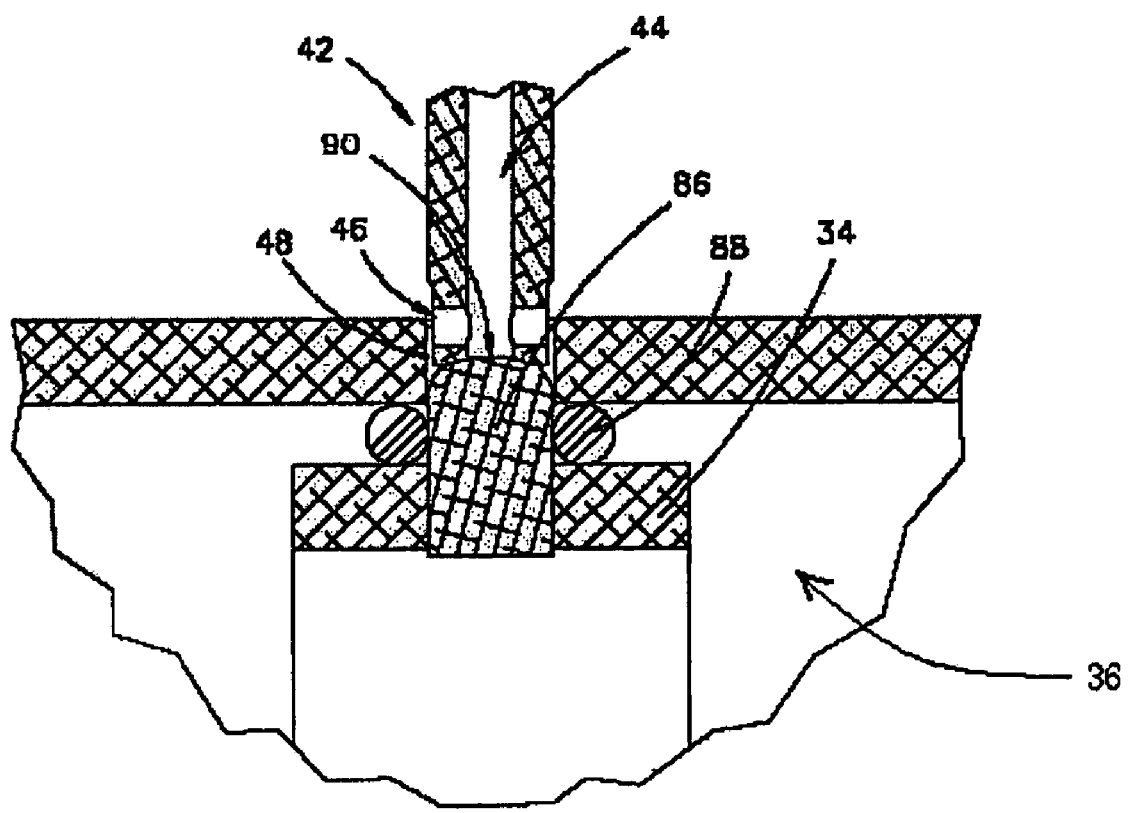
FIG. 6 is an enlarged, cross-sectional view of the self-closing spring-actuated injection valve of FIG. 5 showing an associated injection needle used to supply fluid to the high-pressure terminal connector.

The injection valve 36 used in the above high-pressure swagable terminal connector (FIG. 5) is an example of an integral valve and is illustrated in detail in FIG. 6. A hollow injection needle 42 having side port(s) 46 and injection channel 44 is shown in position just prior to injecting a pressurized fluid. Needle 42 includes a concave portion at its tip which mates with a corresponding convex profile 90 on plug-pin 86, the latter being attached to C-shaped spring 34, which rides on a peripheral inner surface of housing 80 and preferably within a slightly indented channel in the latter. This mating with the needle tip assures that a plug-pin 86 carried by the C-shaped spring 34 is centered in, and just displaced from, injection port 48 while needle 42 is inserted and likewise centers the plug-pin 86 in the injection port 48 of housing 80 as the needle 42 is withdrawn. The convex and concave surfaces could, of course, be reversed and other shapes could be utilized to achieve the same effect. The plug-pin 86 and an O-ring 88 with the plug-pin to extending therethrough, in combination provide a fluid-tight seal when the needle tip is withdrawn and C-shaped spring 34 presses against O-ring 88 so as to deform the latter into a slight saddle shape, whereby the O-ring 88 seats against the inside surface of the housing 80 and the outside surface of C-shaped spring 34. It will be appreciated that, as the pressure within the housing 80 increases, the compressive force on the O-ring 88 increases and thereby improves the sealing performance of O-ring 88. In practice, a clamp assembly (not shown) which houses needle 42 is mounted over injection port 48 to form a fluid-tight seal to the exterior of housing 80. As the tip of needle 42 is actuated and inserted into injection port 48, thereby depressing plug-pin 86 and unseating O-ring 88, fluid can be injected into or withdrawn from the interior of housing 80 through needle 42.

Figure 7:
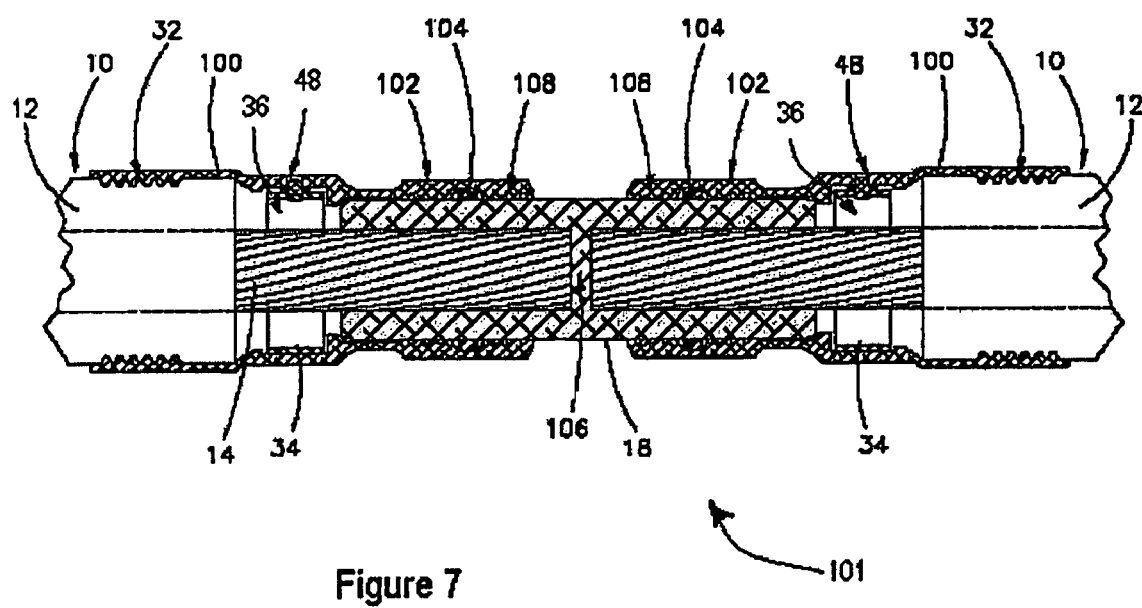
FIG. 7 is a partial cross-sectional view of a swagable high-pressure, dual-housing splice connector having machined teeth in the swaging regions.

A preferred dual-housing, swagable high-pressure splice connector 101, which can be assembled from two identical swagable high-pressure terminal connectors, is illustrated in FIG. 7. In a typical assembly procedure using this embodiment, described here for one of the two cable segments 10 shown in FIG. 7, the insulation jacket 12 is first prepared for accepting a splice crimp connector 18, as described above. A housing 100, which includes injection port 48, is sized such that its larger ID at one end portion is just slightly larger than the OD of insulation jacket 12 and its smaller ID at an opposite end portion is just slightly larger than the OD of splice crimp connector 18. The housing 100 is slid over the corresponding conductor 14 and insulation jacket 12, and the splice crimp connector 18 is then slipped over the end of the conductor 14 and within the housing. Preferably, the lay of the outermost strands of conductor 14 of the cable segment 10 is straightened to an orientation essentially parallel to the axis of the cable segment 10 to facilitate fluid flow into and out of the respective interstitial volume, as well known in the art. Housing 100, having O-ring 104 residing in a groove therein, is swaged with respect to splice crimp connector 18. The swage is applied at position 102 over the O-ring 104 and the machined teeth 108, which may have a profile varying from roughly triangular to roughly square. This swaging operation joins the conductor 14, splice crimp connector 18, and housing 100 in intimate mechanical, thermal and electrical contact and union, and provides a redundant seal to the O-ring 104. Swaging can be performed in a single operation, as described above, or in phases (i.e. wherein splice crimp connector 18 is first swaged together with conductor 14, and then housing 100 is swaged with the splice crimp connector/conductor combination 18/14, provided that the length of the splice crimp connector and length of the housing can accommodate sliding housing 100 out of the way or in the unusual event that the splice crimp connector OD is greater than the insulation OD (e.g., as sometimes found in Japan). In either event, this swaging assures intimate mechanical, thermal and electrical contact and union between housing 100, splice crimp connector 18 and conductor 14; it also results in a fluid-tight seal between housing 100 and splice crimp connector 18. When the splice according to this embodiment is to be used in a flow-through mode, water stop region 106 (i.e., a barrier wall within splice crimp connector 18) may be omitted or drilled out prior to assembly. To facilitate flow through the swaged conductor area, at least one micro tube (not shown) of sufficiently high strength to avoid crushing during subsequent swaging and of sufficient length to allow fluid communication between the annular spaces remaining at each end of the crimp connector 18, may be placed within the annulus formed between the two conductors 14 and the crimp connector 18 when the water stop region 106 is omitted. A swage is then applied to the exterior of housing 100 over machined teeth 32 such that teeth 32 deform insulation jacket 12 sufficiently to form a fluid tight seal and prevent pushback of the insulation jacket when the cable segments are pressurized. The injection port 48 on housing 100 allows fluid to be injected or withdrawn at elevated pressures employing a valve 36 of the type described in FIG. 6 above. When the swagable high-pressure splice connector according to this embodiment is to be used in a flow-through mode, the injection ports may be omitted.

The above high-pressure connectors allow two cable segments to be injected simultaneously using appropriate fitting(s) and injection port(s). Alternatively, two (or more) segments can be injected sequentially starting at an end of the first segment distal to the high-pressure splice connector, through the high-pressure splice connector and then through the second segment (flow-through mode). In this, and any other so-called flow-through mode, the injection port(s) may be eliminated.

In general, the components of the high-pressure connectors, except for any rubber (elastomeric) washers or rubber O-rings employed, are designed to withstand the anticipated pressures and temperatures and may be fabricated from a metal such as aluminum, aluminum alloy, copper, beryllium-copper, or stainless steel. It is also possible to employ non-conductive components if the high-pressure terminal or splice connector design accommodates electrical communication between the associated termination crimp connector or splice crimp connector (i.e., with the conductor in each case) and any subsequently applied conductive insert. That is, the semi-conductor portion of any termination or splice body applied over the high-pressure terminal connector or splice connector, as conventionally practiced in the art, should be essentially at the same electrical potential as the conductor. Preferably, thick aluminum or copper washers, in conjunction with rubber washers are used in connectors employing compression seals, as illustrated in FIG. 3. Since these metals exhibit high thermal conductivities, they facilitate dissipation of heat in the load-carrying termination or splice, thereby reducing the temperature at the surface of the insulation jacket proximal to the respective connector. Rubber washers and O-rings may be formed from any suitable elastomer compatible with the fluid(s) contemplated for injection as well as the maximum operating temperature of the connector. Preferred rubbers include fluorocarbon rubbers, ethylene-propylene rubbers, urethane rubbers and chlorinated polyolefins, the ultimate selection being a function of the solubility of, and chemical compatibility with, the fluid(s) used so as to minimize swell or degradation of any rubber component present. It is contemplated that any high-pressure splice or dead-front terminal connector provides for electrical contact between the respective splice crimp connector or dead-front termination crimp connector and the corresponding conductive insert, as commonly practiced in the art, in order to prevent electrical discharges or corona. In addition, it is preferred that there be good thermal contact between the conductor and the housing (e.g., using set screws, crimping) to provide for heat dissipation away from the conductor.

As will be apparent to those skilled in the art, a high-pressure splice connector is generally symmetrical with respect to a plane perpendicular to the cable axis and through the center of the splice crimp connector, and the assembly procedures described are applied to both ends of the splice. It also will be recognized that different combinations of sealing and securing options, such as illustrated herein, may be combined in "mix-and-match" fashion to provide the intended sealing and securing functions, although the skilled artisan will readily determine the more desirable and/or logical combinations.

In general, the dielectric property-enhancing fluid used (also referred to a tree retardant agent or anti-treeing agent herein) may be selected from any of the compounds known in the art to prevent water trees in polymeric insulation when compounded into the insulation material and/or injected into a new or an in-service cable. Such compounds as aromatic ketones (e.g., acetophenone), fatty alcohols (e.g., dodecanol), UV stabilizers (e.g., 2-ethylhexyltrans-4-methoxycinnamate), and organoalkoxysilanes, illustrate the range of compounds which can be employed as the dielectric-enhancing fluid in the present method. Many such compounds have been described in the patent literature and the interested reader is referred to U.S. Pat. No. 4,144,202 to Ashcraft et al., U.S. Pat. No. 4,212,756 to Ashcraft et al., U.S. Pat. No. 4,299,713 to Maringet et al., U.S. Pat. No. 4,332,957 to Braus et al., U.S. Pat. No. 4,400,429 to Barlow et al., U.S. Pat. No. 4,608,306 to Vincent, U.S. Pat. No. 4,840,983 to Vincent, U.S. Pat. No. 4,766,011 to Vincent et al, U.S. Pat. No. 4,870,121 to Bamji et al., U.S. Pat. No. 6,697,712 to Bertini et al. and U.S. Pat. No. 5,372,841 to Kleyer et al., among others.

According to the method for selecting formulations to treat electrical cables to be more specifically discussed below, it is contemplated that the dielectric property-enhancing fluid may be a mixture of two or more fluids of the type describe herein, provided that such a mixture remains fluid under the conditions of the actual injection. Specific, non-limiting, examples of suitable dielectric property-enhancing materials may be selected from one or more of the following:
phenylmethyldimethoxysilane
phenyltrimethoxysilane
diphenyldimethoxysilane
phenylmethyldiethoxysilane
trimethylmethoxysilane
acetonitrile
benzonitrile
tolyinitrile
t-butyldiphenylcyanosilane
1,3-bis(3-aminopropyl)tetramethyldisiloxane
1,4-bis(3-aminopropyldimethylsilyl)benzene
3-aminopropylpentamethyldisiloxane
aminomethyltrimethylsilane
1,4-bis(3-aminopropyldimethylsilyl)benzene
3-aminopropylmethylbis(trimethylsiloxy)silane
(4-bromophenylethynyl)trimethylsilane
p-chlorophenyltrimethylsilane bis(cyanopropyl)tetramethyldisiloxane
4-aminobutyltriethoxysilane
bis(3-cyanopropyl)dimethoxysilane
N-methylaminopropylmethyldimethoxysilane
N-(3-methacryloxy-2-hydroxypropyl)-3-aminopropyltriethoxysilane
N-ethylaminoisobutyltrimethoxysilane
3-(2,4-dinitrophenylamino)propyltriethoxysilane
N,N-dimethylaminopropyl)trimethoxysilane
(N,N-diethyl-3-aminopropyl)trimethoxysilane
N-butylaminopropyltrimethoxysilane
bis(2-hydroxyethyl)-3-aminopropyltriethoxysilane
3-aminopropyltris(methoxyethoxyethoxy)silane
3-aminopropyltrimethoxysilane
3-aminopropylmethyldiethoxysilane
3-aminopropyldimethylethoxysilane
p-aminophenyltrimethoxysilane
m-aminophenyltrimethoxysilane
3-(m-aminophenoxy)propyltrimethoxysilane
aminomethyltrimethylsilane
N-(2-aminoethyl)-11-aminoundecyltrimethoxysilane
N-(6-aminohexyl)aminopropyltrimethoxysilane
N-(2-aminoethyl)-3-aminopropyltrimethoxysilane
N-(2-aminoethyl)-3-aminopropylmethyldimethoxysilane
N-(2-aminoethyl)-3-aminoisobutylmethyldimethoxysilane
3-(N-allylamino)propyltrimethoxysilane
11-cyanoundecyltrimethoxysilane
2-cyanoethyltrimethoxysilane
2-cyanoethyltriethoxysilane
2-cyanoethylmethyldimethoxysilane
(3-cyanobutyl)methyldimethoxysilane
bis(3-cyanopropyl)dimethoxysilane
3-(triethoxysilylpropyl)-p-nitrobenzamide
2-(diphenylphosphino)ethyltriethoxysilane
3-cyanopropylphenyldimethoxysilane
bis(3-cyanopropyl)dimethoxysilane
phenyltris(methylethylketoximio)silane
vinylmethylbis(methylethylketoximino)silane
vinyltris(methylethylketoximino)silane
phenylmethylbis(dimethylamino)silane
phenethyldimethyl(dimethylamino)silane
n-octyldiisopropyl(dimethylamino)silane
n-octadecyldimethyl(dimethylamino)silane
bis(dimethylamino)vinylmethylsilane
bis(dimethylamino)vinylethylsilane
bis(dimethylamino)diphenylsilane
vinyltris(methylethylketoximino)silane
vinylmethylbis(methylethylketoximino)silane
phenyltris(methylethylketoximio)silane
phenyloctyidialkoxysilane
dodecylmethyldialkoxysilane
n-octadecyldimethylmethoxysilane
n-decyltriethoxysilane
dodecylmethyldiethoxysilane
dodecyltriethoxysilane
hexadecyltrimethoxysilane
1,7-octadienyltriethoxysilane
7-octenyltrimethoxysilane
2-(3-cyclohexenyl)ethyl]trimethoxysilane
(3-cyclopentadienylpropyl)triethoxysilane
21-docosenyltriethoxysilane
(p-tolylethyl)methyldimethoxysilane
4-methylphenethylmethyldimethoxysilane
divinyldimethoxysilane
o-methyl(phenylethyl)trimethoxysilane
styrylethyltrimethoxysilane
(chloro p-tolyl)trimethoxysilane
p-(methylphenethyl)methyldimethoxysilane
2-hydroxy-4-(3-triethoxysilylpropoxy)diphenylketone
dimesityldimethoxysilane
di(p-tolyl))dimethoxysilane
(p-chloromethyl)phenyltrimethoxysilane
chlorophenylmethyldimethoxysilane
$SF_6$ (sulfur hexafluoride)
fluorocarbons or halocarbons
chlorophenyltriethoxysilane
phenethyltrimethoxysilane
phenethylmethyldimethoxysilane
N-phenylaminopropyltrimethoxysilane
(aminoethylaminomethyl)phenethyltriethoxysilane
3-cyanopropylmethyldimethoxysilane
methylphenyl bis (1-phenyl ethenyloxy)silane
methylvinyl bis (1-phenyl ethenyloxy)silane Thus, for example, the fluid may be a mixture of the type disclosed in U.S. Pat. No. 5,372,841 comprising (A) at least one antitreeing agent; and (B) a water-reactive compound, the water-reactive compound having a diffusion coefficient of greater than $10^{-7}$ cm$^2$/second at 50° C. in the polymeric insulation and the mixture having an initial viscosity of $\leq 100$ cP at 25° C., and wherein (A) and (B) are different. A particular fluid of this type is a mixture an aryl-functional alkoxysilane, such as phenylmethyldimethoxysilane or phenyltrimethoxysilane, and a water-reactive compound selected from trimethylmethoxysilane or dimethyldimethoxysilane.

A preferred dielectric property-enhancing fluid is a mixture containing at least one component having a permeability of less than $10^{-10}$ g/second-cm at 25° C. in the insulation polymer and containing no more than two water-reactive groups in each molecule. The above component has a dielectric constant which is at least twice that of the polymeric insulation. An example of such a component is a cyanoalkoxysilane which can have the formula

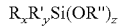

wherein x=1 or 2, y=0 or 1, z=1, 2 or 3, and x+y+z=4, and wherein R is a cyano-containing organic group having 3-13 carbon atoms, R' is an organic group having 1 to 3 carbon atoms, preferably a hydrocarbon group, and OR" is a water-reactive group selected from an alkoxy group having 1 to 3 carbon atoms or an enol ether group. Preferably x=1, y=1, z=2, R is selected from isomers of cyanobutyl, cyanopropyl or cyanoethyl groups, R' is methyl, and OR" is a methoxy group. Specific cyano-containing alkoxysilanes include cyanoethylmethyldimethoxysilane, cyanopropylmethyldimethoxysilane and cyanobutylmethyldimethoxysilane, inter alia.

It is also preferred that the dielectric property-enhancing fluid is a mixture of acetophenone with one or more of the above materials, preferably containing less than about 30% (weight) of the latter. Such compositions containing acetophenone preferably also include at least one material selected from methylphenyl bis (1-phenyl ethenyloxy)silane, methylvinyl bis (1-phenylethyleneoxy)silane, p-tolylethylmethyldimethoxysilane, cyanobutylmethyldimethoxysilane, and cyanopropylmethyldimethoxysilane.

The unexpected increase in injection volume possible with the method for enhancing the cable segment first being discussed (i.e., the above mentioned permeation-adsorption gap) offers advantages beyond the aforementioned elimination of the soak phase utilized by the purveyors of the prior art. For example, the present method allows levels of active ingredients to be supplied to the cable beyond the equilibrium saturation values suggested by the prior art. This extra dielectric property-enhancing fluid provides further flexibility in tailoring treatment fluid combinations which target short-term reactive performance as well as preemptive performance (i.e., a preventive treatment for long-term performance). In each of these cases, the advantages of reactive and preemptive performance can be realized without the need to compromise the proactive performance (i.e., treatment for medium term when cable is statistically likely to fail in near future) targeted by the prior art approach. Moreover, the total amount of such a fluid mixture introduced can be easily adjusted by selecting the injection and residual pressures, according to the method for enhancing the cable segment first being discussed, to tailor the injection to the cable owner's economic or technical requirements. Thus, while it is likely that the short-term performance of any treatment fluid will benefit from the higher transport rates described herein, the method also allows the introduction of an entirely new class of materials which, without the benefit of the current method, would not diffuse appreciably into the insulation or could not be efficiently supplied in sufficient volume to the interstitial void volume. Such a component, defined herein as a Class S material has a permeability of less than about $10^{-10}$ g/second-cm at 25° C. as well as solubility of about 0.0001 to about 0.02 gram/cm$^3$ at 25° C. or has a diffusivity (diffusion coefficient) of less than about $10^{-8}$ cm$^2$/sec at 50° C., each property being determined in the insulation polymer. The method allows the use of Class S materials since it accelerates permeation of fluid into the insulation while the pressure is still high enough to provide an enhanced driving force and it addresses the above mentioned observation that many in-service cables present an inadequate interstitial void volume relative to the volume of fluid required to treat the cable. The inclusion of such a slowly diffusing material in the fluid composition being injected is believed to impart improved long-term (e.g., 10 to 40 years) performance. If such a Class S material were used in the methods of the prior art, a corresponding reduction in the amount of short-term performance materials, medium-term performance materials, or both, would have to be made. In the former case it is unlikely that the inadequately treated cable would provide reliable performance for the time required to recognize any benefits from the low diffusivity materials. In the alternative, the costly and dangerous soak phase would have to be greatly extended, this option being effectively prohibited by the safety and economic implications.

It is therefore preferred that at least two classes of materials, and more preferably three classes, are combined to provide the dielectric property-enhancing fluid. Optimum amounts and optimum ratios of such components are selected based on the specific geometry of the cable being treated and the performance characteristics desired by the circuit owner. These three classes are defined as follows, wherein each property is measured in the cable insulation material at the indicated temperature:

Class Q—Quickly diffusing materials having a diffusion coefficient greater than about $10^{-7}$ cm$^2$/sec at 50° C., such as acetophenone and trimethylmethoxysilane or other high diffusivity materials disclosed in the above cited U.S. Pat. No. 5,372,841. Such materials impart short-term performance (reactive performance) (generally, 0 to about 12 months).

Class M—Moderately diffusing materials having a diffusion coefficient greater than about $10^{-8}$ cm$^2$/sec, but less than about $10^{-7}$ cm$^2$/sec at 50° C., such as phenylmethyldimethoxysilane and p-tolylethylmethyldimethoxysilane. Such materials impart medium-term performance (proactive performance) (generally about 12 to about 120 months).

Class S—Slowly diffusing materials or low solubility materials, as discussed above, having a low solubility of about 0.0001 to about 0.02 gram/cm$^3$ at 25° C. or having a diffusivity less than about $10^{-8}$ cm$^2$/sec at 50° C., and having a permeability less than about $10^{-10}$ g/cm·s at 25° C., each property being measured in the insulation material, such as cyanobutylmethyldimethoxysilane, cyanoethylmethyldimethoxysilane and cyanopropylmethyldimethoxysilane. Such materials impart long-term (preemptive) performance (generally greater than about 120 months).

For each desired class of material to be employed, the optimum concentration in the strand shield (conductor shield) and the insulation jacket are calculated or determined by experiment. For materials with solubility greater than about 0.02 grams/cm$^3$ at 25° C. (many Class Q and Cass M materials fall into this category), this optimum is generally the respective saturation level at average soil temperature at the depth the cable is buried, often at about 1 meter. Supply of fluid substantially above this level has been shown to result in the above described super-saturation which may be deleterious to the circuit reliability. In view of the low solubility of Class S materials, their optimum concentration is generally greater than the saturation level since there is little chance of damage due to this phenomenon, and the effective life of the treated cable increases with the amount of Class S material supplied.

It is believed that materials of one of the above defined classes interact little with materials from another class since the diffusivities between any two classes typically differ by an order of magnitude. Furthermore, it has been well established in the art that the solubility of oligomers is substantially less than that of corresponding monomers. Therefore, damage to a cable due to supersaturation over long periods of time using constituents which form oligomers (e.g., organoalkoxysilane reacting with adventitious water in the cable) is not a concern. Thus, to enjoy the benefits of short-term, medium-term, and long-term reliability performance, the present method teaches the following protocol:

(a) The saturation (or other optimum level) for each material class (i.e., there may be two or more components within each material class) is measured (or calculated) in the conductor shield and insulation. The optimum level (or the minimum optimum level for low solubility components) should preferably account for the anticipated average conductor shield and insulation temperature and the typical temperature cycling ($\Delta T$) over the anticipated lifetime of the cable.

(b) The concentration of each class and each component in the conductor shield, as determined in step (a), is multiplied by the specific mass of the conductor shield to give the required weight of the respective class and component therein. Likewise, the concentration of each class and each component in the insulation jacket, is multiplied by the specific mass of the insulation to give the required weight of the respective class and component therein, each such calculation being appropriately adjusted to reflect the actual cable segment length. These products are then summed to provide the total minimum weight of fluid mixture required to treat the segment.

(c) A starting pressure in excess of 50 psig is assumed and the minimum weight of fluid required from step (b) is compared to the total weight corresponding to total volume available (i.e., interstitial+annular+adsorption/permeation gap) at this pressure. The interstitial void volume can be easily calculated from the strand conductor geometry, as described in U.S. Pat. No. 5,279,147. The annular volume for a given cable, as a function of the pressure, can be obtained from rigorous calculations, as described above which provide a plot similar to FIG. 1, lower curve. The adsorption/permeation gap volume can also be obtained from a plot similar to FIG. 1 (upper curve for a given mix of components and for a given cable). Alternatively, once the previously discussed adsorption/permeation gap is experimentally determined as a function of pressure for a given mix of components and a first cable geometry, this data can be used to provide a good approximation of the corresponding gap values for a second cable by multiplying the former data by the ratio of the cross-sectional area of the second conductor shield to that of the first cable.

(d) If there is sufficient total volume (weight) available (which may be the case for some cables with larger and less compacted conductors), the amount of Class S material (or a low solubility Class Q or Class M material) is increased until the total volume supplied equals the available total volume.

(e) If there is not sufficient total volume available at the minimum pressure, the pressure is increased and step (c) is iterated until at least the minimum total volume (weight) of fluid can be accommodated.

Based on the above protocol, the candidate composition is mixed prior to injection and the prescribed amount thereof is injected into the interstitial void volume of the cable segment at the appropriate pressure using one of the herein described high-pressure connectors. Once the prescribed quantity of fluid is delivered, the injection is terminated and the fluid confined within the interstitial void volume at a similar residual pressure. Thus another embodiment of the method for enhancing the cable segment first being discussed comprises filling the interstitial void volume of a cable segment with the amount of the dielectric property-enhancing fluid composition required to saturate the conductor shield and the insulation jacket of the cable segment ($W_s$) at a pressure P, and confining it therein at a similar residual pressure, as previously described. In this embodiment, when $W_s$ is greater than the weight ($W_i$) of this composition which can be injected into the interstitial void volume at pressure P, the pressure is adjusted according to the above protocol such that $W_s = W_i$. On the other hand, when $W_s$ is less than $W_i$, an additional weight (W) of at least one Class S material is added to the composition before injecting the composition such that $(W+W_s)=W_i$.

To further clarify the above protocol, two examples of its application are provided. These examples employ hypothetical formulations, are provided for illustrative purposes only and do not represent actual data. They are not to be construed as limiting the scope of any method discussed herein.

Example 1 illustrates the determination of the optimum treatment for 1000 feet of concentric I/O, 100% XLPE insulation cable. A preliminary formulation, shown in the table below, which provides the desired reliability benefits, is selected. The treatment fluid comprises acetophenone (a Class Q material), vinylmethylbis(1-phenylethyleneoxy)silane (VMB, a Class M material) and S1 and S2 (two typical Class S materials). The concentrations (weight percent=100× solubility in g/cm$^3$, where the insulation is XLPE with a density of about 1 g/cm$^3$) have been arbitrarily selected for optimum performance, either from empirical observations, theoretical considerations such as saturation levels, or both. The specific gravity of the fluid mixture is 1.03.

|  | Acetophenone | VMB | S1 | S2 |
|---|---|---|---|---|
| Weight % solute in insulation jacket | 1.0% | 3.5% | 0.5% | 0.5% |
| Weight % solute In conductor shield | 3.0% | 16.0% | 1.0% | 1.0% |

The cross-sectional areas for the insulation jacket ($A_{in}$) and the conductor shield ($A_{cs}$), are each calculated from simple geometric principles, as discussed above. These are used to calculate the respective specific volumes (expressed in ft$^3$/kft) in the insulation and conductor shield, respectively, as shown in the following table.

| | | |
|---|---|---|
| Specific volume of insulation (Vi) | 2.34 | $= A_{in} \cdot 1000 \text{ ft} \cdot 1^2 \text{ ft}^2/12^2 \text{ in}^2$ |
| Specific volume of conductor shield ($V_{cs}$) | 0.289 | $= A_{cs} \cdot 1000 \text{ ft} \cdot 1^2 \text{ ft}^2/12^2 \text{ in}^2$ |

Each specific volume is then multiplied by each selected component concentration from the previous table. These results are illustrated below, wherein the total calculated fluid requirement to treat the 1000 ft segment is about 12.2 pounds and the fractions of each of its four components are also displayed (e.g., for the VMB fluid in the conductor shield: 0.289 (ft$^3$/kft)×62.4 lb/ft$^3$×1.03 (density)×0.16 (% of VMB)= 2.97 lb).

|  | Wt. of Mixture | Acetophenone | VMB | S1 | S2 |
|---|---|---|---|---|---|
| Specific component mass in insulation | 8.26 | 1.50 | 5.26 | 0.75 | 0.75 |
| Specific component mass in conductor shield | 3.91 | 0.56 | 2.97 | 0.19 | 0.19 |
| Total Component Mass | 12.17 | 2.06 | 8.23 | 0.94 | 0.94 |

A minimum injection pressure of 300 psig is arbitrarily chosen to provide a rapid increase in post-injection dielectric performance and the respective amounts of fluid (expressed in pounds for the 1000 ft segment) which can be accommodated are calculated or obtained from a plot similar to FIG. 1, according to the above discussed protocol. These are displayed in the table below, wherein $A_i$=cross-sectional area of interstices; $A_a$=cross-sectional annular area at 300 psig; SG=specific gravity of fluid mix.

| | | |
|---|---|---|
| Specific mass within interstices | 5.4 | $A_i \cdot SG \cdot 1000 \cdot 62.4/12^2$ |
| Specific mass within annulus | 3.00 | $A_a \cdot SG \cdot 1000 \cdot 62.4/12^2$ |
| Specific mass-adsorption/permeation | 2.39 | From appropriate graph |
| Total Specific Mass Supplied | 10.8 | |

It is seen that the amount of fluid supplied at 300 psig is only 10.8 pounds, this being 1.4 pounds (i.e., 12.2−10.8) short of the previously determined optimum amount. The present method teaches an increase in pressure until the optimum quantity of fluid (i.e., 12.2 lb) can be supplied to the cable segment. For this example, the results of the iterative calculation according to the above described protocol wherein the pressure is increased to 359 psig are displayed in the table below, wherein $A_a'$=annular cross-sectional area at 359 psig.

| | | |
|---|---|---|
| Specific mass within interstices | 5.4 | $A_i' \cdot SG \cdot 1000 \cdot 62.4/12^2$ |
| Specific mass within annulus | 3.61 | $A_a \cdot SG \cdot 1000 \cdot 62.4/12^2$ |
| Specific mass-adsorption/permeation | 3.14 | From appropriate graph |
| Total Specific Mass Supplied | 12.2 | |

Example 2 illustrates the above protocol applied to the optimum treatment of a 1000 ft concentric 750 kcmil, 100% XLPE insulation, cable segment. The fluid formulation of Example 1 is again assumed and the various calculations shown therein are made using the corresponding dimensions of this cable's geometry.

| | |
|---|---|
| Specific volume of insulation (ft$^3$/kft) | 4.84 |
| Specific volume of conductor shield (ft$^3$/kft) | 1.10 |

Again, each specific volume in the table above is multiplied by each desired concentration component in the formulation table (see Example 1). These results are illustrated below, wherein the total fluid requirement to treat 1000 feet of cable is 32.0 pounds and the respective fractions of its four components are displayed.

| | Mixture | Aceto-phenone | VMB | S1 | S2 |
|---|---|---|---|---|---|
| Specific component mass in insulation | 17.1 lb | 3.11 | 10.89 | 1.55 | 1.55 |
| Specific component mass in conductor shield | 14.9 lb | 2.12 | 11.31 | 0.71 | 0.71 |
| Total Component Mass | 32.0 lb | 5.22 | 22.16 | 2.26 | 2.26 |

A minimum injection pressure of 100 psig is chosen to provide a rapid increase in post-injection dielectric performance. The interstitial, annular and adsorption/permeation gap volumes are calculated or obtained from a plot similar to FIG. 1, according to the above described protocol, and converted to the corresponding amount of the respective components, as shown in the following table. The specific mass supplied at 100 psig is about 66.8 pounds, or more than twice the minimum optimum requirement.

| | | |
|---|---|---|
| Specific mass within interstices | 54.2 lb | $=A_i \cdot SG \cdot 1000 \cdot 62.4/12^2$ |
| Specific mass within annulus | 11.1 lb | $=A_a \cdot SG \cdot 1000 \cdot 62.4/12^2$ |
| Specific mass-adsorption/permeation | 1.5 lb | From appropriate graph |
| Total Specific Mass Supplied | 66.8 lb | |

Rather than wasting the excess volume with a diluent as taught by U.S. Pat. No. 6,162,491, the present method teaches an increase in the supply of Class S materials which provide further extension to the treated cable's reliable life. That increase in the Class S materials to supply a total of the 66.8 lb of fluid, as previous shown to be accommodated by this segment, is demonstrated by revision of the fluid formulation, as shown in the table below.

| | Mixture | Aceto-phenone | VMB | S1 | S2 |
|---|---|---|---|---|---|
| Specific component mass in insulation | 17.1 lb | 3.11 | 10.9 | 1.55 | 1.55 |
| Specific component mass in conductor shield | 14.8 lb | 2.12 | 11.3 | 0.71 | 0.71 |
| Class S materials above minimum | 34.9 lb | | | 17.45 | 17.45 |
| Total | 66.8 lb | 5.23 | 22.2 | 19.7 | 19.7 |

A further advantage of the method for enhancing the cable segment first being discussed is the elimination of the costly and dangerous step of evacuating a cable prior to, and during, fluid injection. The method of the prior art is costly, primarily because of the labor involved. An injection team must wait for complete evacuation of the cable before injection is commenced. The prior art method can create a potentially dangerous condition when applied to energized cables in view Paschen's Law, which predicts a decrease in dielectric strength of air (or other gas) at reduced pressures. Application of a vacuum in the prior art method is preferred and currently practiced since this facilitates a complete fill. In the absence of a vacuum, bubbles would likely form as the fluid flowed through termination cavities or splice cavities or even through the tangle of interstices of the cable strands. Even when higher pressures are utilized, the pressure is always released once the injection is complete, and any gas bubbles which were temporarily dissolved in the fluid at the elevated pressure will immediately effervesce, resulting in a portion of the cable being untreated or under treated. Further, the vacuum is desirable in the prior art method since a typical −13 psig pressure provides a 45% or greater driving force to accelerate the flow of fluid down the length of cable, and indeed improves the likelihood that the fluid will flow through the entire length of the cable and therefore avoid a failed injection. The method for enhancing the cable segment suffers none of these problems. First, at the preferred pressures contemplated herein, the flow rate of the fluid is much higher and is much more likely to scour water or contaminants with its greater shear. Further it is believed that even if a small gas bubble is present, it will quickly dissolve in the fluid under the influence of the residual pressure and will not immediately effervesce to create a new bubble. Instead, the gas will now diffuse axially in the fluid to distribute itself at a very low concentration, but still at a relatively high partial pressure. Because of the high partial pressure the gas will quickly diffuse out of the cable into the surrounding soil. Thus the method avoids the use of such a costly and dangerous vacuum.

Another advantage of the method for enhancing the cable segment first being discussed is that there is no need to desiccate the strands of the cable segment. Because of the high flow and higher sheer forces described earlier, most of the water, or other contaminants in a cable, will be flushed from the interstices by the injection. Even if some water is left in the strands, the method is less sensitive to the water, because an excess of water reactive fluid can be supplied.

Because the prior art method injects fluid through splices which were previously installed, there is a need to test each splice's ability to accommodate flow and pressure. Yet another advantage of the method for enhancing the cable segment first being discussed, when combined with the novel connectors described above, is that there is now no need to flow test and pressure test the strands of a medium voltage power cable. Again, because of the high injection pressures preferably used herein it is believed that almost all stranded cables will flow. Leak testing is obviated since the connectors employ devices designed to accommodate the higher pressures.

The method for selecting formulations to treat electrical cables of the present invention by injection into a cable segment utilizes a method of matching the needs of the cable and the cable owner with a portfolio of materials, each of which addresses different sets of technical, operational and economic issues. A unique cocktail is mixed with either circuit-owner cable size granularity, or even individual cable granularity, in mind in order to meet the requirements of the circuit owner. In other words performance is optimized for each application based on a menu of end-user choices, geometry, cable operational history, and forecasted operational loads instead of the one-size-fits-all approach used in the prior art. A partial list of properties and commercial elements which may be controlled and optimized to establish a target formulation includes the following:

Five Ps of Performance
(1) Post-failure or short-term performance (<12 months);
(2) Proactive or medium-term performance (12 months to 10 years);
(3) Preemptive or long-term performance (>10 years);
(4) Price (including fluid costs, process labor intensity, and duration & scope of warranty);
(5) Properties (including compatibility with aluminum or copper conductors and flammability);

Three Parameters
(6) Cable geometry;
(7) Anticipated cable temperature profile (typical) which depends upon . . .
  a. average load,
  b. ground temperature at cable depth,
  c. soil thermal conductivity;
(8) $\Delta T$ (anticipated temperature cycling; typical)
  a. maximum load,
  b. minimum load,
  c. soil thermal conductivity.

In the present method for selecting formulations at least one class of fluids, more preferably two classes of fluids and even more preferably three classes of fluids are supplied in optimum amounts. Two or more classes are used in optimum ratios depending on the specific geometry of the cable being treated and the performance characteristics desired by the circuit owner. As described above, the three classes of materials are:

Class Q—Quickly diffusing materials having a diffusion coefficient greater than about 10-7 cm2/sec at 50° C., such as acetophenone and trimethylmethoxysilane or other high diffusivity materials disclosed in the above cited U.S. Pat. No. 5,372,841. Such materials impart short-term performance (reactive performance) (generally, 0 to about 12 months).

Class M—Moderately diffusing materials having a diffusion coefficient greater than about $10^{-8}$ cm$^2$/sec, but less than about $10^{-7}$ cm$^2$/sec at 50° C., such as phenylmethyldimethoxysilane and p-tolylethylmethyldimethoxysilane. Such materials impart medium-term performance (proactive performance) (generally about 12 to about 120 months).

Class S—Slowly diffusing materials or low solubility materials, as discussed above, having a low solubility of about 0.0001 to about 0.02 gram/cm$^3$ at 25° C. or having a diffusivity less than about $10^{-8}$ cm$^2$/sec at 50° C., and having a permeability less than about $10^{-10}$ g/cm·s at 25° C., each property being measured in the insulation material, such as cyanobutylmethyldimethoxysilane, cyanoethylmethyldimethoxysilane and cyanopropylmethyldimethoxysilane. Such materials impart long-term (preemptive) performance (generally greater than about 120 months).

Figure 8:
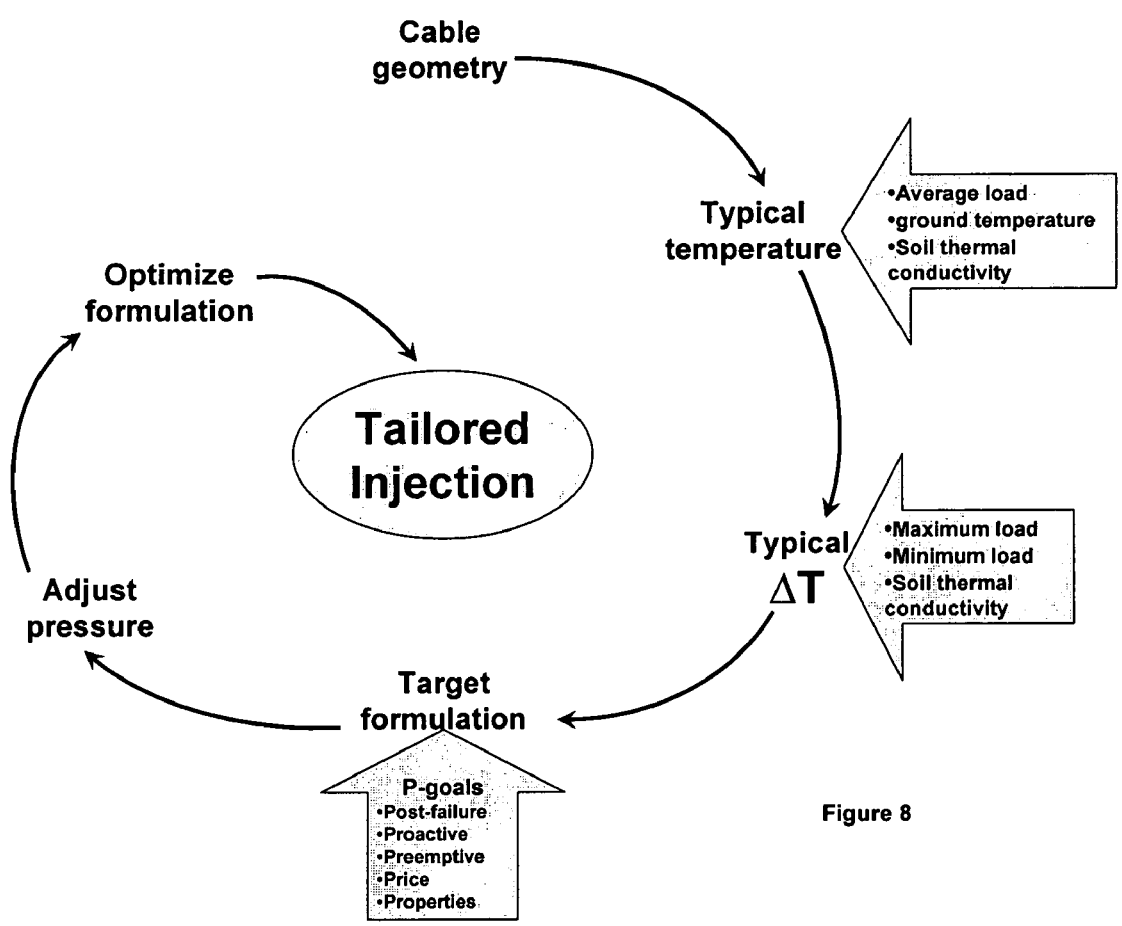
FIG. 8 is a schematic diagram summarizing methodology and variables of the present invention.

A "Tailored Injection" method is illustrated in FIG. 8 with a spiral schematic, and summarizes the impact of each of these eight variables and also provides an overview of the optimization methodology of the present method. The prior art single formulation approach is an inherent compromise which attempts to balance the eight parameters but must make trade-offs between them. The inventor of the present method incorporate the above described method for treating electrical cable at sustained elevated pressure as a tool which provides a new degree of freedom in formulation which removes many of the constraining compromises required by the prior art approaches. The above described method for treating electrical cable at sustained elevated pressure encompasses the last two steps in the "Tailored Injection" spiral, namely "Adjust pressure" and "Optimize formulation. "

Disadvantages of the prior art methods which are mitigated or eliminated with the present method for selecting formulations to treat electrical cables include:
(1) The addition of trimethylmethoxysilane (a Class Q compound) as suggested by U.S. Pat. No. 5,372,841 improves the short-term performance at the expense of longer term performance and significantly increases the vapor pressure and the flammability of the mixture.
(2) There are no provisions for preemptive or long-term performance. This prior art disadvantage along with the first are discussed extensively in the above described method for treating electrical cable at sustained elevated pressure.
(3) The reliance on a single formulation does not accommodate substantial temperature differences ($\Delta T$) or geometry differences between cables.

The three input parameters, namely cable geometry, temperature, and $\Delta T$ are uncontrollable parameters which constrain the formulation choices. In the discussion which follows, each of these three input parameters is described in detail and strategies which may be employed to compensate for the constraints they represent are provided.

Cable Geometry

In one sense, the cable geometry was chosen by the circuit owner several decades prior to treatment when it was placed in the ground. In another sense, the above described method for treating electrical cable at sustained elevated pressure allows the alteration of that geometry by the application of pressure. As demonstrated above, while the starting geometry and the volume in the interstitial spaces of the strands is unchangeable, the annulus between the strand bundle and the conductor shield can be increased with increasing pressure, and most unexpectedly additional fluid can be adsorbed within the conductor shield itself. This alteration of the cable's geometry and permeation is represented by the last two steps in the "Tailored Injection" spiral shown in FIG. 8, namely "Adjust pressure" and "Optimize formulation."

Anticipated Cable Temperature

Figure 9:
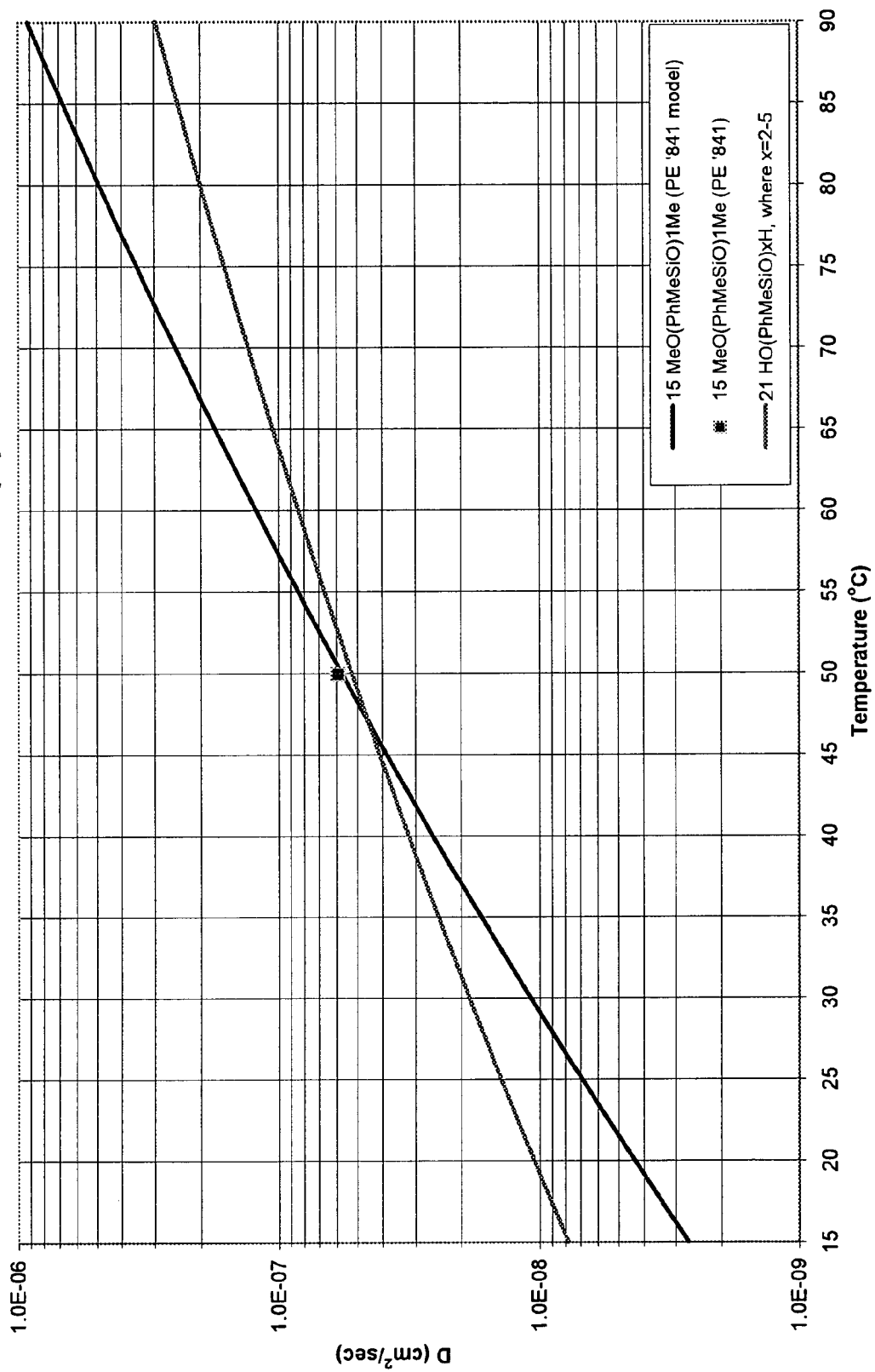
FIG. 9 is a graph of diffusion coefficients in polyethylene of phenylmethyldimethoxysilane and oligomeric condensation products thereof as a function of temperature.

Cables are well known in the art to operate over a wide range of temperatures. Low temperatures are often the ambient ground temperature at approximately 1 meter in depth. This temperature typically ranges from 0° C. in cryic soil regimes common for example in Canada and Scandinavia to 28° C. in hyperthermic soil regimes common for example in Northern Australia, Florida, South Texas, and the low deserts of Arizona, and when the cables are lightly loaded, the cables are very close to uniformly at ground temperature. High temperatures for XLPE cable may include conductor temperatures approaching their maximum conductor design temperature of 90° C. For all practical purposes, the temperature of the conductor shield will be very close to that of the conductor. The insulation, however, will have a temperature profile across its radius and the typical profile will be a function of the ambient soil temperature and the thermal conductivity of the soil. This generalization is sufficiently accurate for the most common case of single-phase direct-buried cable; however, for cables in conduits or cables buried in common trenches in close proximity with each other or duct banks, more complex calculations, well known in the art, are utilized to calculate temperature profiles. Permeation is the product of diffusivity and solubility. Data available in the prior art demonstrate that permeability changes by over an order of magnitude over a range of approximately 40° C. (see "Injection Supersaturation," Minutes of the 104$^{th}$ Meeting of the IEEE, PES, ICC, Oct. 26, 1998, Appendix A(5-30)-1, which states that "At room temperature, [phenylmethyldimethoxysilane monomer] would take 16 months to penetrate 175 mils of insulation. At 60° C., [phenylmethyldimethoxysilane monomer] would require about two months to penetrate the same 175 mils."). The diffusion coefficients for the monomer (phenylmethyldimethoxysilane, A Class M material used in the prior art) and the oligomers (HO(PhMeSiO)$_x$H, where x=2–5) are plotted in the "Diffusion Coefficients f(T)" graph shown in FIG. 9. All values in FIG. 9 are from U.S. Pat. No. 5,372,841, Table 3. It is clear that even greater temperature fluctuations are possible and hence permeation rates of up to two orders of magnitude must be accommodated. Unlike the prior art one-size-fits all approach, the present method for selecting formulations ascertains the temperature profiles which are likely to be experienced by the cable to be treated over its anticipated life and the formulation is modified to match the geometry, temperature and required performance. The average temperature profile and temperature cycling profile are considered along with the five Ps of performance and the cable geometry. While the diffusion coefficients of the prior art materials are generally appropriate for average cable temperatures below 15° C., the same treatment which might last 15 years at that temperature would be depleted after about 2 years at 60° C. The present method for selecting formulations alters the formulation in the 60° C. case to favor Class S materials which have diffusion coefficients approximately 10 to 100 times lower.

As a non-limiting example of the forgoing, consider Example 1 of the above described method for treating electrical cable at sustained elevated pressure where the goal was to provide the optimum treatment for 1000 feet of concentric 1/0, 100% XLPE insulation. Unstated in that example were the criteria of the present method and it was assumed that the temperature (25° C.) and performance requirements were typical for such a cable. The formulation for that case is reproduced in the table below.

|  | Wt. of Mixture | Acetophenone | VMB | S1 | S2 |
|---|---|---|---|---|---|
| Specific component mass in insulation | 8.26 | 1.50 | 5.26 | 0.75 | 0.75 |
| Specific component mass in conductor shield | 3.91 | 0.56 | 2.97 | 0.19 | 0.19 |
| Total Component Mass | 12.17 | 2.06 | 8.23 | 0.94 | 0.94 |

If the same cable design anticipated a typical temperature of 50° C., the present method for selecting formulations teaches an entirely different formulation. For this example, assume constant solubility between 25° C. and 50° C. and the following diffusivities of the 4 formulation components as shown in the first table below, wherein the thermal acceleration factor is ratio of diffusivity at 50° C. to that at 25° C. Actual diffusion coefficients and actual solubility over the temperature range of interest can be easily measured for each component of interest. At the higher temperature of 50° C., the formulation in the table above would lose its short-term, medium-term, and long-term efficacy, as shown by the "Reliable Life@50° C. (months)" column in the second table, below.

Based on accelerated life testing under the low temperature scenario, the acetophenone is anticipated to provide reliable performance for about 12 months. The VMB provides reliable performance from approximately 9 months to 12 years (144

| Material | Diffusivity @ 25° C. (cm$^2$/sec) | Diffusivity @ 50° C. (cm$^2$/sec) | Thermal Acceleration Factor |
|---|---|---|---|
| Acetophenone | $2.9 \times 10^{-9}$ | $1.3 \times 10^{-7}$ | 45 |
| VMB | $3.6 \times 10^{-9}$ | $3.1 \times 10^{-8}$ | 8.6 |
| S1 | $1.6 \times 10^{-10}$ | $2.6 \times 10^{-9}$ | 16 |
| S2 | $9.1 \times 10^{-11}$ | $1.1 \times 10^{-9}$ | 12 | months). S1 and S2 together are anticipated to provide reliable performance from 6 to 50 years (72-600 months). Dividing each of these performance time periods by the thermal acceleration factor in the above table yields new values as outlined in the table below.

| Material | Reliable Life @ 25° C. (months) | Reliable Life @ 50° C. (months) |
|---|---|---|
| Acetophenone | 0-12 | 0-0.3 |
| VMB | 9-144 | 1-17 |
| S1/S2 | 72-600 | 4.5-50 |

Obviously the reliability expectations at 50° C. are unacceptable in the short-term (the 20-day gap between acetophenone depletion and VMB effectiveness) and the long-term (50 months or 4.2 years). The present method for selecting formulations (taken together with the above described method for treating electrical cable at sustained elevated pressure) teaches the two options available to assure the reliability over a definable life-span:

1. Provide more than the saturation level of components in order to extend the reliable life within the realm in which the individual component performs. There are four broad cases, where cables can be provided with an excess quantity of fluid above the saturation level without any risk of failure caused by supersaturation or oversaturation. (1) The cable is unlikely to have prolonged or significant temperature cycling. (2) The compound has a solubility of less than 0.02 g/cm$^3$ at 50° C. in the insulation. (3) The compound change in solubility between the highest typical temperature and lowest typical temperature is less than 4. The change in solubility is defined as the solubility (mass/unit volume) at the highest temperature to be encountered in typical operation, $S_{high}$ divided by the solubility at the lowest temperature to be encountered in typical operation to be encountered, $S_{low}$. (4). The diffusion coefficient is greater than approximately $10^{-6}$ cm$^2$/sec at 50° C.
  a. This may be accomplished by increasing the pressure to accommodate more fluid.
  b. This may be accomplished by increasing the ratio of one component which is more desirable at the expense of a second less critical component.
2. Choose a different material or materials with different solubility and diffusivity characteristics with similar or superior restorative effects. The new material may be used to substitute for all or a portion of the component which may cause supersaturation or over saturation.

As is readily recognized by someone skilled in the art, there are a variety of physical, chemical and electrical effects known to improve cable performance. The following is a partial list of the most important known restorative effects:
  1. Water scavenging
  2. Void filling
  3. Dielectric stress grading
  4. UV absorption
  5. Partial Discharge (PD) suppression (inception and extinction)

Also readily appreciated by someone skilled in the art is the portability of these effects by their inclusion as ligand functionality in a larger treatment molecule particularly a silane, which is itself part of cocktail of materials.] The following are non-limiting examples of the virtually infinite number of possibilities:
  A high dielectric nitrile or cyano group can be attached to a alkoxysilane to make an efficacious stress grading and water scavenging fluid.
  3-methylbenzophenone is a larger analog of acetophenone and will have lower permeability but will have similar UV absorption effects, similar dielectric stress grading, and similar PD suppression.
  A siloxane dimer with two water reactive ligands could be substituted for an analogous silane monomer with two water reactive ligands to lower the solubility and the diffusion coefficient without losing void filling, dielectric stress grading, UV absorption, or PD suppression characteristics, and compromising water scavenging by only 40%. (e.g., MeO—Si(Me)(Ph)—O—Si(Me)(Ph)—OMe is the analogous dimer of the monomer PhMeSi(OMe)$_2$.)

As a non-limiting example, reliable performance comparable to the 25° C. results in the forgoing example could be obtained at 50° C. by making the following specific changes shown in the table below: (1) Substitute 3-methylbenzophenone for acetophenone in the formulation to increase the reliable life in the short-term realm, (2) substitute a partial hydrolyzate of VMB (designated as VMB$^{ph}$) to decrease the permeation rate by a factor of 4 to 9, and (3) substitute high temperature analogs of both S1 and S2 (S1-ht and S2-ht) having diffusion coefficients approximately 16 and 12 times lower, respectively. For this example it is assumed that 3-methylbenzophenone has a permeation rate approximately one-third that of acetophenone. There are a variety of aromatic ketones which might be used to tailor the permeation rate and provide suitable partial discharge extinction.

| | Mixture | Methylbenzophenone | VMB$^{ph}$ | S1-ht | S2-ht |
|---|---|---|---|---|---|
| Specific component mass. in insulation | 8.26 | 1.50 | 5.26 | 0.75 | 0.75 |
| Specific component mass in conductor shield | 3.91 | 0.56 | 2.97 | 0.19 | 0.19 |
| Total | 12.17 | 2.06 | 8.23 | 0.94 | 0.94 |

There is a virtually infinite number of formulation combinations which can be devised to meet the performance requirements. The preceding example is but a single manifestation of those varied possibilities.

ΔT

The geometry of the cable, the thermal conductivity of the soil and the change in load (amperes) on a cable determines how dramatic temperature changes in the cable are. The load for most cables is seasonal and in fact highly variable throughout a given day. Thus, for warm climate areas the maximum seasonal cable loads are generally experienced in the summer when air-conditioner loads are the greatest. For cold climate areas the maximum cable loads are generally experienced in the winter when the outside temperatures are lowest. Similarly, on a typical July day in Austin, Tex. for example, the maximum load is reached at 4:00 PM and sinks to its minimum load at 4:00 AM. Each locale has its own unique load profile. Furthermore, even within a given circuit, the minimum and maximum loads vary considerably. Consider for example the typical 1/0 URD circuit which starts at a pole and travels underground connecting 10 transformers in series. If each transformers load at 4:00 PM is 15 amperes, the cable from the pole to the first transformer (Cable 1) is carrying 10 transformers×15 amperes or 150 amps. The conductor of Cable 1 is likely to be in the 60-80° C. range at 4:00PM. These types of calculation are well known in the art and are referred to as ampacity calculations. One source for such calculations is IEEE—IPCEA Power Cable Ampacities for Copper & Aluminum Conductors, published jointly in 1962 by the IEEE and the IPCEA (IEEE S-135; IPCEA P-46-426). Contrast Cable 1 to the last cable (Cable 10) which serves only a single transformer and hence carries only 15 amperes of current and is likely to have a conductor temperature of approximately 25-30° C. Not only do the maximum and minimum temperature changes affect this ΔT, they also have an effect on the average anticipated temperature profile previously described. While the prior art approach would treat all ten of these cables identically, the present method teaches that the formula should be varied along the length of this example circuit. Cable 10 would not experience significant changes in temperature (ΔT) and hence there would be no constraint on the maximum solubility or maximum concentration of any single component. On the other hand for Cable 1, where the anticipated ΔT of the conductor is approximately 40° C. and the anticipated maximum ΔT for the insulation is just less than 40° C. the formulation would have to be either:
  Composed entirely of components wherein the sum of the solubilities within each class in the insulation and the shield is less than 2% by weight at 25° C., or
  Those components with solubility greater than 2% would have to be limited in the formulation such that they, and any other sister components in the same class, could not exceed 2% by weight in the insulation.

The insulation will generally be cooler than the conductor temperature; however the insulation closest to the conductor will be just slightly lower (perhaps 1° C.) than the conductor temperature.

It should be noted that in each case the anticipated ΔT is within the timeframe that the class of materials will be present. For example, with Cable 1 above, a Class Q material which is only going to be around for six months post-injection may be introduced above 2% in the month of November in Austin, Tex. since the maximum contemplated ΔT for November through April is less than 20° C. These rules are generalized in the following formula.

$$C_{max}=0.05-0.0006 \cdot \Delta T$$

Where,
- $C_{max}$ is the maximum concentration as a weight fraction (solubility and/or maximum solute) within each material class during the time period where the material class is present at or above the threshold concentration;
- ΔT is the maximum change in insulation temperature, which is generally just slightly lower than the maximum change in conductor temperature, and ΔT is between of 0 and 75° C.
- 0.05 and 0.0006 are empirical constants determined from experiments and information available in the art for typical cross-linked polyethylene cables. Other empirical constants could be substituted for other cases without departing from the spirit of the present method.

For example, suppose ΔT is 50° C., $C_{max}=0.05-0.0006 \cdot \Delta T$ would equal 0.05−0.0006·50 or 0.02 weight fraction or $2\%_w$ of each material class.

Post-Failure Performance

If a circuit owner is treating cables to extend their life well before they have actually failed, there is little reason to supply Class Q performance enhancing materials. This customer treatment strategy is called proactive if there have been a few isolated failures in cables being treated or it is preemptive if there have been no failures. Lowering the amount of Class Q materials allows either Price saving or an increase in the amount of Class M and Class S materials supplied to the cable which will extend the cable's long-term performance. The prior art approach provides the same ratio of Class Q materials to Class M materials without regard to the circuit owners desires. The present method simply asks the circuit owner whether they are concerned about short-term post injection failures or not and then adjusts the Class Q materials as shown in the table below:

| Customer expectation | Class Q Supply |
| --- | --- |
| There is no chance of post injection failure | Do not use Class Q materials. |
| There is little chance of post injection failure as this cable has been failure free. | Use 50% of the maximum allowable Class Q material(s) unless constrained by other considerations. |
| The cable in question has failed more than 120 days prior to treatment | Use 75% of the maximum allowable Class Q material(s) unless constrained by other considerations. |
| The cable in question has failed within the last 120 days and another failure in the short term is quite likely | Use Class Q material(s) up the maximum allowable as constrained by other considerations. |

It is possible that there are other nuances which place a particular cable between the four categories outline above and it is not a departure from the present method to interpolate between the four identified cases.

Proactive Performance

If a circuit owner is treating cables preemptively well before any cable failures are anticipated, lowering the amount of Class Q materials and Class M materials allows either Price saving or an increase in the amount of Class S materials supplied to the cable which will extend the cable's long-term performance. The prior art approach provides the same ratio of Class Q materials to Class M materials without regard to the circuit owners desires. The present method for selecting formulations simply asks the circuit owner whether they are concerned about medium term reliability or not and then adjusts the Class Q and Class M materials as shown in the table below:

| Customer expectation | Class Q Supply |
| --- | --- |
| The cable is likely to provide reliable performance for 2 years. | Do not use Class Q materials. |
| The cable is likely to provide reliable performance for 5 years. | Do not use Class Q materials. Use 50% of the maximum allowable Class M materials unless constrained by other considerations, or decrease the average permeation of the Class M material(s) by a factor of approximately 2. |
| The cable is likely to provide reliable performance for 10 years. | Do not use Class Q materials. Use 25% of the maximum allowable Class M materials unless constrained by other considerations. Decrease the average permeation of the Class M material(s) by a factor of approximately 4. |
| The cable is likely to provide reliable performance for 15 years. | Do not use Class Q materials. Do not use Class M materials. |

It is possible that there are other nuances which place a particular cable between the four categories outlined above and it is not a departure from the present method to interpolate between the four identified cases.

Preemptive Performance

If technology and money were not an issue, circuit owners would desire infinite life at a very low cost. Unfortunately, both technology and money are an issue and preemptive performance is where the two meet. Very long life, even in excess of that provided by new cables, is possible with the present method, particularly when it is combined with the above described method for treating electrical cable at sustained elevated pressure which allows a greater amount of fluid to be supplied. While the prior art approach provides the same ratio of Class Q materials to Class M materials and the same total amount for fluid without regard to the circuit owners desires, the present method for selecting formulations simply asks the circuit owner to make the value judgment which weighs the desired Preemptive Performance against the Price they are willing to pay within the constraints of the cable geometry and the available fluid technologies. This trade-off is described as one element in the Price discussion which follows.

Price

Obviously, the cost of each potential restorative material can vary considerably depending on the ease of manufacture and scale of its commercial availability. In addition to the direct cost of the material, the cost of handling and injection can vary depending on its physical properties. The circuit owner may choose to compromise preemptive (or long-term)

performance for price depending upon the circuit owner's evaluation of the time value of money. Deferred economics principles, well described in the art (see "Recent Advances in Cable Rejuvenation Technology," IEEE/PES Summer Meeting, 1999), are utilized to weigh the incremental cost of extended life against the incremental extended life for a given formulation change. For example, suppose the use of component "omega" is know to extend the reliable life of the formulation from 30 years to 35 years and the incremental cost for using omega over its less costly counterpart is $1.20 per foot. Is the circuit owner best served by utilizing omega and paying the incremental $1.20? Using the Net Present Value (NPV) analysis well known in the art, the deferred economics of this decision are easily determined and depend primarily on the discount factor for future cash flows and the anticipated cost of replacement.

Properties

A wide variety of materials is available in the art which might aid in the extension of reliable life of a circuit. Each of these materials has other advantages, and disadvantages which must also be considered in the formulation decision. As non-limiting examples of this concept, it is known in the art that certain aluminum alloys are more susceptible to corrosion by methanol than other aluminum alloys. To the extent the circuit owner is engaged in a process to improve the circuit reliability there is little desire to introduce methanol to a cable which has a susceptible alloy. In such a case the decision maker might decrease the quantity, or even exclude, low priced and commonly used methoxy or alkoxy silanes in favor of water reactive materials which produce no methanol or materials which are not water reactive at all. As another case, consider the safety aspects of including materials in the formulation having low flash points and hence high flammability. While these materials may be efficacious, the safety consequences may not be allowable for certain situations, such as duct-manhole systems where the consequences of a fire or explosion can be fatal. The prior art uses a single active formulation for every case. The present method for selecting formulations teaches the inclusion of a wide variety of materials which can meet an equally wide variety of needs and including circuit owner input to exclude or minimize certain kinds of materials which fall outside of allowable properties.

The present method for selecting formulations includes both processes and business methods which together allow the formulation to be tailored to the end-user's requirements with far fewer compromises than the prior art approaches.

One embodiment of the present method for selecting formulations involves injecting insulated (solid dielectrics such as polyethylene or EPR or solid-liquid dielectrics such as paper-oil) stranded power cables (including medium voltage, low voltage and high voltage) to provide a tailored mixture of treatment materials to assure reliable life for various cable geometries and operational characteristics.

Another embodiment of the method for selecting formulations includes considering cable geometry and the anticipated temperature of a cable to vary the formulation of at least one injection compound.

The method for selecting formulations may be used where one or more of the following are considered to provide an optimum formulation:
 a. Post-failure or short-term performance (<12 months);
 b. Proactive or medium-term performance (12 months to 10 years);
 c. Preemptive or long-term performance (>10 years);
 d. Price (including fluid costs, process labor intensity, and duration & scope of warranty);
 e. Properties (including compatibility with aluminum or copper conductors and flammability).

The method for selecting formulations may be employed where the anticipated temperature includes both anticipated typical temperature and the anticipated typical temperature cycles.

The method for selecting formulations may be practiced where the variable formulation includes injection compounds from at least two different classes.

The method may also be practiced where the variable formulation includes injection compounds from at least three different classes.

Combinations of various aspects of the method for selecting formulations may be utilized but for brevity are not all set forth herein.

That which is claimed is:

1. A method for selecting components for a mixture to be injected into an interstitial void volume adjacent to a central stranded conductor of an electrical cable segment having the central conductor encased in a polymeric insulation jacket to enhance the dielectric properties of the cable segment, comprising:
 selecting an anticipated operating temperature profile for the cable segment to be used in selecting the components for the mixture to be injected into the interstitial void volume of the cable segment;
 selecting a minimum desired time period to be used in selecting the compounds for the mixture to be injected into the interstitial void volume of the cable segment during which the dielectric properties of the cable segment are to be enhanced by the mixture;
 selecting a first component for the mixture to provide the cable segment with a reliable life spanning a first time period for the selected operating temperature profile;
 selecting a second component for the mixture to provide the cable segment with a reliable life spanning a second time period at least in part extending beyond the first time period for the selected operating temperature profile; and
 selecting a third component for the mixture to provide the cable segment with a reliable life spanning a third time period at least in part extending beyond the second time period and beyond the minimum desired time period for the selected operating temperature profile, wherein said central stranded conductor is larger than:
 4/0 (120 mm$^2$), when said conductor comprises round strands;
 4/0 (120 mm$^2$), when said conductor comprises concentric strands;
 250 kcm (225 mm$^2$), when said conductor comprises compressed strands; or
 1000 kcm (500 mm$^2$), when said conductor comprises compact strands.

2. A method for making a mixture to be injected into an interstitial void volume adjacent to a central stranded conductor of an electrical cable segment having the central conductor encased in a polymeric insulation jacket to enhance the dielectric properties of the cable segment, comprising:
 selecting an anticipated operating temperature profile for the cable segment to be used in selecting components for the mixture to be injected into the interstitial void volume of the cable segment;
 selecting a minimum desired time period to be used in selecting compounds for the mixture to be injected into the interstitial void volume of the cable segment during which the dielectric properties of the cable segment are to be enhanced by the mixture;

selecting a desired quantity of the mixture to be injected into the interstitial void volume of the cable segment to at least fill the interstitial void volume adjacent to a central stranded conductor of the cable segment;
selecting first, second and third components for the mixture in first, second and third quantities, respectively, to produce at least the desired quantity of the mixture to be injected into the interstitial void volume of the cable segment, with:
 the first component for the mixture and the first quantity of the first component to be included in the mixture being further selected so as to provide the cable segment with a reliable life spanning a first time period for the selected operating temperature profile,
 the second component for the mixture and the second quantity of the second component to be included in the mixture being further selected so as to provide the cable segment with a reliable life spanning a second time period at least in part extending beyond the first time period for the selected operating temperature profile, and
 the third component for the mixture and the third quantity of the third component to be included in the mixture being further selected so as to provide the cable segment with a reliable life spanning a third time period at least in part extending beyond the second time period and beyond the minimum desired time period for the selected operating temperature profile; and
mixing the first, second and third quantities of the first, second and third components together, wherein said central stranded conductor is larger than:
4/0 (120 mm$^2$), when said conductor comprises round strands;
4/0 (120 mm$^2$), when said conductor comprises concentric strands;
250 kcm (225 mm$^2$), when said conductor comprises compressed strands; or
1000 kcm (500 mm$^2$), when said conductor comprises compact strands.

3. A method for making a mixture to be injected into an interstitial void volume adjacent to a central stranded conductor of an electrical cable segment having the central conductor encased in a polymeric insulation jacket to enhance the dielectric properties of the cable segment, comprising:
 selecting an anticipated operating temperature profile for the cable segment to be used in selecting components for the mixture to be injected into the interstitial void volume of the cable segment;
 selecting a minimum desired time period to be used in selecting compounds for the mixture to be injected into the interstitial void volume of the cable segment during which the dielectric properties of the cable segment are to be enhanced by the mixture;
 selecting a desired quantity of the mixture to be injected into the interstitial void volume of the cable segment to at least fill the interstitial void volume adjacent to a central stranded conductor of the cable segment;
 selecting a first component for the mixture and a first quantity of the first component to be included in the mixture to produce a desired first concentration of the first component in the mixture so as to provide the cable segment with a reliable life spanning a first time period for the selected operating temperature profile;
 selecting a second component for the mixture and a second quantity of the second component to be included in the mixture to produce a desired second concentration of the second component in the mixture so as to provide the cable segment with a reliable life spanning a second time period at least in part extending beyond the first time period for the selected operating temperature profile;
 selecting a third component for the mixture and a third quantity of the third component to be included in the mixture to produce a desired third concentration of the third component in the mixture so as to provide the cable segment with a reliable life spanning a third time period at least in part extending beyond the second time period and beyond the minimum desired time period for the selected operating temperature profile; and mixing the first, second and third quantities of the first, second and third components together, wherein said central stranded conductor is larger than:
4/0 (120 mm$^2$), when said conductor comprises round strands;
4/0 (120 mm$^2$), when said conductor comprises concentric strands;
250 kcm (225 mm$^2$), when said conductor comprises compressed strands; or
1000 kcm (500 mm$^2$), when said conductor comprises compact strands.

4. A method for making a mixture to be injected into an interstitial void volume adjacent to a central stranded conductor of an electrical cable segment having the central conductor encased in a polymeric insulation jacket to enhance the dielectric properties of the cable segment, comprising:
 selecting an anticipated operating temperature profile for the cable segment to be used in selecting components for the mixture to be injected into the interstitial void volume of the cable segment;
 selecting a minimum desired time period to be used in selecting compounds for the mixture to be injected into the interstitial void volume of the cable segment during which the dielectric properties of the cable segment are to be enhanced by the mixture;
 selecting a desired quantity of the mixture to be injected into the interstitial void volume of the cable segment to at least fill the interstitial void volume adjacent to a central stranded conductor of the cable segment;
 selecting a desired maximum price for the desired quantity of the mixture to be injected into the interstitial void volume of the cable segment;
 selecting first, second and third components for the mixture in first, second and third quantities, respectively, and having first, second and third prices, respectively, to produce at least the desired quantity of the mixture to be injected into the interstitial void volume of the cable segment with the first, second and third prices of the first, second and third components used to produce the desired quantity of the mixture having a combined price no greater than the desired maximum price, with:
  the first component for the mixture and the first quantity of the first component to be included in the mixture being further selected so as to provide the cable segment with a reliable life spanning a first time period for the selected operating temperature profile,
  the second component for the mixture and the second quantity of the second component to be included in the mixture being further selected so as to provide the cable segment with a reliable life spanning a second time period at least in part extending beyond the first time period for the selected operating temperature profile, and
  the third component for the mixture and the third quantity of the third component to be included in the mixture being further selected so as to provide the cable segment with a reliable life spanning a third time period at least in part extending beyond the second time period and beyond the minimum desired time period for the selected operating temperature profile; and mixing the first, second and third quantities of the first, second and third components together, wherein said central stranded conductor is larger than:

4/0 (120 mm$^2$), when said conductor comprises round strands;

4/0 (120 mm$^2$), when said conductor comprises concentric strands;

250 kcm (225 mm$^2$), when said conductor comprises compressed strands; or 1000 kcm (500 mm$^2$), when said conductor comprises compact strands.

5. A method for enhancing the dielectric properties of an electrical cable segment having a central stranded conductor encased in a polymeric insulation jacket and having an interstitial void volume in the region of the conductor, the method comprising:

selecting an anticipated operating temperature profile for the cable segment to be used in selecting the components for a mixture to be injected into the interstitial void volume of the cable segment;

selecting a minimum desired time period to be used in selecting the compounds for the mixture to be injected into the interstitial void volume of the cable segment during which the dielectric properties of the cable segment are to be enhanced by the mixture;

selecting a first component for the mixture to provide the cable segment with a reliable life spanning a first time period for the selected operating temperature profile;

selecting a second component for the mixture to provide the cable segment with a reliable life spanning a second time period at least in part extending beyond the first time period for the selected operating temperature profile;

selecting a third component for the mixture to provide the cable segment with a reliable life spanning a third time period at least in part extending beyond the second time period and beyond the minimum desired time period for the selected operating temperature profile;

injecting the mixture into the interstitial void volume with the mixture at a pressure below the elastic limit of the polymeric insulation jacket; and confining the mixture within the interstitial void volume at a residual pressure greater than about 50 psig, the pressure being imposed along the entire length of the cable segment and being below the elastic limit, whereby the residual pressure within the void volume promotes the transport of the mixture into the polymeric insulation jacket.

6. The method according to claim 5 for use with a cable segment where the central stranded conductor is surrounded by a conductor shield, wherein the mixture injected into the interstitial void volume saturates the conductor shield and the polymeric insulation jacket with the mixture, and wherein the mixture contained within the interstitial void volume has a weight less than the weight of the mixture required to saturate the conductor shield and the polymeric insulation jacket.

7. The method according to claim 5, wherein the mixture is supplied at a pressure greater than about 50 psig for more than about 2 hours before being confined within in the interstitial void volume.

8. The method according to claim 5, wherein the pressure used in injecting the interstitial void volume is greater than the residual pressure.

9. The method according to claim 5, wherein the residual pressure is about 100 psig to about 1000 psig.

10. The method according to claim 9, wherein the residual pressure is about 300 psig to about 600 psig.

11. A method for enhancing the dielectric properties of an electrical cable segment having a central stranded conductor encased in a polymeric insulation jacket and having an interstitial void volume in the region of the conductor, the cable segment having a first closable high-pressure connector attached at one terminus thereof and a second closable high-pressure connector attached at another terminus thereof, each of the first and second connectors providing fluid communication to the interstitial void volume, the method comprising:

selecting an anticipated operating temperature profile for the cable segment to be used in selecting the components for a mixture to be injected into the interstitial void volume of the cable segment;

selecting a minimum desired time period to be used in selecting the compounds for the mixture to be injected into the interstitial void volume of the cable segment during which the dielectric properties of the cable segment are to be enhanced by the mixture;

selecting a first component for the mixture to provide the cable segment with a reliable life spanning a first time period for the selected operating temperature profile;

selecting a second component for the mixture to provide the cable segment with a reliable life spanning a second time period at least in part extending beyond the first time period for the selected operating temperature profile;

selecting a third component for the mixture to provide the cable segment with a reliable life spanning a third time period at least in part extending beyond the second time period and beyond the minimum desired time period for the selected operating temperature profile;

opening both the first and second connectors and introducing the mixture via the first connector so as to fill the interstitial void volume;

closing the second connector and introducing an additional quantity of the mixture via the first connector at a pressure greater than about 50 psig, but less than the elastic limit of the polymeric insulation jacket; and closing the first connector so as to contain the mixture within the interstitial void volume at a residual pressure greater than about 50 psig, but below the elastic limit, whereby the pressure within the interstitial void volume promotes the transport of the mixture into the polymeric insulation jacket.

12. A method for enhancing the dielectric properties of an electrical cable segment between first and second connectors, the cable segment having a central stranded conductor encased in a polymeric insulation jacket and having an interstitial void volume in the region of the conductor, the method comprising:

selecting an anticipated operating temperature profile for the cable segment to be used in selecting the components for a mixture to be injected into the interstitial void volume of the cable segment;

selecting a minimum desired time period to be used in selecting the compounds for the mixture to be injected into the interstitial void volume of the cable segment during which the dielectric properties of the cable segment are to be enhanced by the mixture;

selecting a first component for the mixture to provide the cable segment with a reliable life spanning a first time period for the selected operating temperature profile;

selecting a second component for the mixture to provide the cable segment with a reliable life spanning a second time period at least in part extending beyond the first time period for the selected operating temperature profile;

selecting a third component for the mixture to provide the cable segment with a reliable life spanning a third time period at least in part extending beyond the second time period and beyond the minimum desired time period for the selected operating temperature profile;

filling through at least one of the first and second connectors the interstitial void volume along the entire length of the cable segment with the mixture at a pressure below the elastic limit of the polymeric insulation jacket; and confining with the first and second connectors the mixture within the interstitial void volume at a residual pressure selected to promote the transport of the mixture into the polymeric insulation jacket, with the residual pressure being imposed along the entire length of the cable segment and being below the elastic limit.

13. The method according to claim 12, wherein the residual pressure at which the mixture is confined within the interstitial void volume is sufficient to expand the interstitial void volume along the entire length of the cable segment by at least 5%, but below an elastic limit of the polymeric insulation jacket.

14. The method according to claim 12, wherein the filling and confining of the mixture within the interstitial void volume includes:

attaching the first connector to a first terminus of the cable segment;

attaching the second connector to a second terminus of the cable segment, each of the first and second connectors providing fluid communication to the interstitial void volume;

opening both of the first and second connectors and introducing the mixture via the first connector so as to fill the interstitial void volume;

closing the second connector and introducing an additional quantity of the mixture via the first connector at a pressure greater than about 50 psig, but less than an elastic limit of the polymeric insulation jacket; and closing the first connector so as to contain the mixture within the interstitial void volume at a residual pressure greater than about 50 psig, but below the elastic limit.

15. A method for selecting a mixture to be injected into an interstitial void volume adjacent to a central stranded conductor of an electrical cable segment having the central conductor encased in a polymeric insulation jacket to enhance the dielectric properties of the cable segment, comprising:

selecting an anticipated operating temperature profile for the cable segment to be used in selecting components for the mixture to be injected into the interstitial void volume of the cable segment;

selecting a minimum desired time period to be used in selecting compounds for the mixture to be injected into the interstitial void volume of the cable segment during which the dielectric properties of the cable segment are to be enhanced by the mixture;

selecting a desired quantity of the mixture to be injected into the interstitial void volume of the cable segment to at least fill the interstitial void volume adjacent to a central stranded conductor of the cable segment; and selecting first, second and third components for the mixture in first, second and third quantities, respectively, to produce at least the desired quantity of the mixture to be injected into the interstitial void volume of the cable segment, with:

the first component for the mixture and the first quantity of the first component to be included in the mixture being further selected so as to provide the cable segment with a reliable life spanning a first time period for the selected operating temperature profile, the second component for the mixture and the second quantity of the second component to be included in the mixture being further selected so as to provide the cable segment with a reliable life spanning a second time period at least in part extending beyond the first time period for the selected operating temperature profile, and the third component for the mixture and the third quantity of the third component to be included in the mixture being further selected so as to provide the cable segment with a reliable life spanning a third time period at least in part extending beyond the second time period and beyond the minimum desired time period for the selected operating temperature profile, wherein said central stranded conductor is larger than:

4/0 (120 mm$^2$), when said conductor comprises round strands;

4/0 (120 mm$^2$), when said conductor comprises concentric strands;

250 kcm (225 mm$^2$), when said conductor comprises compressed strands; or 1000 kcm (500 mm$^2$), when said conductor comprises compact strands.

16. A method for selecting a mixture to be injected into an interstitial void volume adjacent to a central stranded conductor of an electrical cable segment having the central conductor encased in a polymeric insulation jacket to enhance the dielectric properties of the cable segment, comprising:

selecting an anticipated operating temperature profile for the cable segment to be used in selecting components for the mixture to be injected into the interstitial void volume of the cable segment;

selecting a minimum desired time period to be used in selecting compounds for the mixture to be injected into the interstitial void volume of the cable segment during which the dielectric properties of the cable segment are to be enhanced by the mixture;

selecting a desired quantity of the mixture to be injected into the interstitial void volume of the cable segment to at least fill the interstitial void volume adjacent to a central stranded conductor of the cable segment;

selecting a first component for the mixture and a first quantity of the first component to be included in the mixture to produce a desired first concentration of the first component in the mixture so as to provide the cable segment with a reliable life spanning a first time period for the selected operating temperature profile;

selecting a second component for the mixture and a second quantity of the second component to be included in the mixture to produce a desired second concentration of the second component in the mixture so as to provide the cable segment with a reliable life spanning a second time period at least in part extending beyond the first time period for the selected operating temperature profile; and selecting a third component for the mixture and a third quantity of the third component to be included in the mixture to produce a desired third concentration of the third component in the mixture so as to provide the cable segment with a reliable life spanning a third time period at least in part extending beyond the second time period and beyond the minimum desired time period for the selected operating temperature profile, wherein said central stranded conductor is larger than:

4/0 (120 mm$^2$), when said conductor comprises round strands;

4/0 (120 mm$^2$), when said conductor comprises concentric strands;

250 kcm (225 mm$^2$), when said conductor comprises compressed strands; or 1000 kcm (500 mm$^2$), when said conductor comprises compact strands.

17. A method for selecting a mixture to be injected into an interstitial void volume adjacent to a central stranded conductor of an electrical cable segment having the central conductor encased in a polymeric insulation jacket to enhance the dielectric properties of the cable segment, comprising:

selecting an anticipated operating temperature profile for the cable segment to be used in selecting components for the mixture to be injected into the interstitial void volume of the cable segment;

selecting a minimum desired time period to be used in selecting compounds for the mixture to be injected into the interstitial void volume of the cable segment during which the dielectric properties of the cable segment are to be enhanced by the mixture;

selecting a desired quantity of the mixture to be injected into the interstitial void volume of the cable segment to at least fill the interstitial void volume adjacent to a central stranded conductor of the cable segment;

selecting a desired maximum price for the desired quantity of the mixture to be injected into the interstitial void volume of the cable segment; and selecting first, second and third components for the mixture in first, second and third quantities, respectively, and having first, second and third prices, respectively, to produce at least the desired quantity of the mixture to be injected into the interstitial void volume of the cable segment with the first, second and third prices of the first, second and third components used to produce the desired quantity of the mixture having a combined price no greater than the desired maximum price, with:

the first component for the mixture and the first quantity of the first component to be included in the mixture being further selected so as to provide the cable segment with a reliable life spanning a first time period for the selected operating temperature profile, the second component for the mixture and the second quantity of the second component to be included in the mixture being further selected so as to provide the cable segment with a reliable life spanning a second time period at least in part extending beyond the first time period for the selected operating temperature profile, and the third component for the mixture and the third quantity of the third component to be included in the mixture being further selected so as to provide the cable segment with a reliable life spanning a third time period at least in part extending beyond the second time period and beyond the minimum desired time period for the selected operating temperature profile, wherein said central stranded conductor is larger than:

4/0 (120 mm$^2$), when said conductor comprises round strands;

4/0 (120 mm$^2$), when said conductor comprises concentric strands;

250 kcm (225 mm$^2$), when said conductor comprises compressed strands; or 1000 kcm (500 mm$^2$), when said conductor comprises compact strands.

18. A method for selecting at least one dielectric property-enhancing fluid to be injected into an interstitial void volume adjacent to a central stranded conductor of an electrical cable segment having the central conductor encased in a polymeric insulation jacket to enhance the dielectric properties of the cable segment, comprising:

selecting an anticipated operating temperature profile for the cable segment to be used in selecting the at least one dielectric property-enhancing fluid to be injected into the interstitial void volume of the cable segment;

selecting a minimum desired time period to be used in selecting the at least one dielectric property-enhancing fluid to be injected into the interstitial void volume of the cable segment during which the dielectric properties of the cable segment are to be enhanced by the at least one dielectric property-enhancing fluid;

selecting at least one dielectric property-enhancing fluid to provide the cable segment with a reliable life spanning at least the minimum desired time period for the selected operating temperature profile, wherein said central stranded conductor is larger than:

4/0 (120 mm$^2$), when said conductor comprises round strands;

4/0 (120 mm$^2$), when said conductor comprises concentric strands;

250 kcm (225 mm$^2$), when said conductor comprises compressed strands; or 1000 kcm (500 mm$^2$), when said conductor comprises compact strands.

19. The method according to claim 18, wherein selecting the at least one dielectric property-enhancing fluid includes selecting at least first and second components for a mixture to be injected into the interstitial void volume of the cable segment, with the first component for the mixture to provide the cable segment with a reliable life spanning a first time period for the selected operating temperature profile, and the second component for the mixture to provide the cable segment with a reliable life spanning a second time period at least in part extending beyond the first time period for the selected operating temperature profile.

20. The method according to claim 19, wherein selecting the at least one dielectric property-enhancing fluid further includes selecting a third component for the mixture to be injected into the interstitial void volume of the cable segment, with the third component for the mixture to provide the cable segment with a reliable life spanning a third time period at least in part extending beyond the second time period and beyond the minimum desired time period for the selected operating temperature profile and with the third component being a combination of at least two constituent components, each to provide the cable segment with a reliable life spanning at least a portion of the third time period for the selected operating temperature profile.

21. The method according to claim 18, wherein the selected operating temperature profile is selected at least in part based on the anticipated fluctuations over time of the difference between the anticipated operating temperature of the central conductor and the anticipated temperature of an outer portion of the polymeric insulation jacket during operation of the central conductor during at least a portion of the minimum desired time period.

22. A method for selecting a mixture to be injected into an interstitial void volume adjacent to a central stranded conductor of an electrical cable segment having the central conductor encased in a polymeric insulation jacket to enhance the dielectric properties of the cable segment, comprising:
- selecting an anticipated operating temperature profile for the cable segment to be used in selecting components for the mixture to be injected into the interstitial void volume of the cable segment;
- selecting a minimum desired time period to be used in selecting compounds for the mixture to be injected into the interstitial void volume of the cable segment during which the dielectric properties of the cable segment are to be enhanced by the mixture;
- selecting a desired quantity of the mixture to be injected into the interstitial void volume of the cable segment; and
- selecting at least first and second components for the mixture in first and second quantities, respectively, to produce at least the desired quantity of the mixture to be injected into the interstitial void volume of the cable segment, with:
  - the first component for the mixture and the first quantity of the first component to be included in the mixture being further selected so as to provide the cable segment with a reliable life spanning a first time period for the selected operating temperature profile, and
  - the second component for the mixture and the second quantity of the second component to be included in the mixture being further selected so as to provide the cable segment with a reliable life spanning a second time period at least in part extending beyond the first time period for the selected operating temperature profiles wherein said central stranded conductor is larger than:
    - 4/0 (120 mm$^2$), when said conductor comprises round strands;
    - 4/0 (120 mm$^2$), when said conductor comprises concentric strands;
    - 250 kcm (225 mm$^2$), when said conductor comprises compressed strands; or
    - 1000 kcm (500 mm$^2$), when said conductor comprises compact strands.

23. A method for selecting a mixture to be injected into an interstitial void volume adjacent to a central stranded conductor of an electrical cable segment having the central conductor encased in a polymeric insulation jacket to enhance the dielectric properties of the cable segment, comprising:
- selecting an anticipated operating temperature profile for the cable segment to be used in selecting components for the mixture to be injected into the interstitial void volume of the cable segment;
- selecting a minimum desired time period to be used in selecting compounds for the mixture to be injected into the interstitial void volume of the cable segment during which the dielectric properties of the cable segment are to be enhanced by the mixture; selecting a desired quantity of the mixture to be injected into the interstitial void volume of the cable segment;
- selecting a first component for the mixture and a first quantity of the first component to be included in the mixture to produce a desired first concentration of the first component in the mixture so as to provide the cable segment with a reliable life spanning a first time period for the selected operating temperature profile; and
- selecting a second component for the mixture and a second quantity of the second component to be included in the mixture to produce a desired second concentration of the second component in the mixture so as to provide the cable segment with a reliable life spanning a second time period at least in part extending beyond the first time period for the selected operating temperature profile, wherein said central stranded conductor is larger than:
  - 4/0 (120 mm$^2$), when said conductor comprises round strands;
  - 4/0 (120 mm$^2$), when said conductor comprises concentric strands;
  - 250 kcm (225 mm$^2$), when said conductor comprises compressed strands; or
  - 1000 kcm (500 mm$^2$), when said conductor comprises compact strands.

24. A method for selecting a mixture to be injected into an interstitial void volume adjacent to a central stranded conductor of an electrical cable segment having the central conductor encased in a polymeric insulation jacket to enhance the dielectric properties of the cable segment, comprising:
- selecting an anticipated operating temperature profile for the cable segment to be used in selecting components for the mixture to be injected into the interstitial void volume of the cable segment;
- selecting a minimum desired time period to be used in selecting compounds for the mixture to be injected into the interstitial void volume of the cable segment during which the dielectric properties of the cable segment are to be enhanced by the mixture;
- selecting a desired quantity of the mixture to be injected into the interstitial void volume of the cable segment;
- selecting a desired maximum price for the desired quantity of the mixture to be injected into the interstitial void volume of the cable segment; and
- selecting at least first and second components for the mixture in first and second quantities, respectively, and having first and second prices, respectively, to produce at least the desired quantity of the mixture to be injected into the interstitial void volume of the cable segment with the first and second prices of the first and second components used to produce the desired quantity of the mixture having a combined price no greater than the desired maximum price, with:
- the first component for the mixture and the first quantity of the first component to be included in the mixture being further selected so as to provide the cable segment with a reliable life spanning a first time period for the selected operating temperature profile, and
- the second component for the mixture and the second quantity of the second component to be included in the mixture being further selected so as to provide the cable segment with a reliable life spanning a second time period at least in part extending beyond the first time period for the selected operating temperature profile, wherein said central stranded conductor is larger than:
  - 4/0 (120 mm$^2$), when said conductor comprises round strands;
  - 4/0 (120 mm$^2$), when said conductor comprises concentric strands;
  - 250 kcm (225 mm$^2$), when said conductor comprises compressed strands; or
  - 1000 kcm (500 mm$^2$), when said conductor comprises compact strands.

25. A method for enhancing the dielectric properties of an electrical cable segment having a central stranded conductor encased in a polymeric insulation jacket and having an interstitial void volume in the region of the conductor, the method comprising:

selecting an anticipated operating temperature profile for the cable segment to be used in selecting at least one dielectric property-enhancing fluid to be injected into the interstitial void volume of the cable segment;

selecting a minimum desired time period to be used in selecting the at least one dielectric property-enhancing fluid to be injected into the interstitial void volume of the cable segment during which the dielectric properties of the cable segment are to be enhanced by the mixture;

selecting the at least one dielectric property-enhancing fluid to provide the cable segment with a reliable life spanning at least the minimum desired time period for the selected operating temperature profile;

injecting the at least one dielectric property-enhancing fluid into the interstitial void volume with the at least one dielectric property-enhancing fluid at a pressure below the elastic limit of the polymeric insulation jacket; and confining the at least one dielectric property-enhancing fluid within the interstitial void volume at a residual pressure greater than about 50 psig, the pressure being imposed along the entire length of the cable segment and being below the elastic limit, whereby the residual pressure within the interstitial void volume promotes the transport of the at least one dielectric property-enhancing fluid into the polymeric insulation jacket.

26. The method according to claim 25, wherein selecting the at least one dielectric property-enhancing fluid includes selecting at least first and second components for a mixture to be injected into the interstitial void volume of the cable segment, with the first component for the mixture to provide the cable segment with a reliable life spanning a first time period for the selected operating temperature profile, and the second component for the mixture to provide the cable segment with a reliable life spanning a second time period at least in part extending beyond the first time period for the selected operating temperature profile.

27. The method according to claim 26, wherein selecting the at least one dielectric property-enhancing fluid further includes selecting a third component for the mixture to be injected into the interstitial void volume of the cable segment, with the third component for the mixture to provide the cable segment with a reliable life spanning a third time period at least in part extending beyond the second time period and beyond the minimum desired time period for the selected operating temperature profile and with the third component being a combination of at least two constituent components, each to provide the cable segment with a reliable life spanning at least a portion of the third time period for the selected operating temperature profile.

28. The method according to claim 25, wherein the selected operating temperature profile is selected at least in part based on the anticipated fluctuations over time of the difference between the anticipated operating temperature of the central conductor and the anticipated temperature of an outer portion of the polymeric insulation jacket during operation of the central conductor during at least a portion of the minimum desired time period.

29. The method according to claim 25 for use with a cable segment where the central stranded conductor is surrounded by a conductor shield, wherein the at least one dielectric property-enhancing fluid injected into the interstitial void volume saturates the conductor shield and the polymeric insulation jacket with the at least one dielectric property-enhancing fluid, and wherein the at least one dielectric property-enhancing fluid contained within the interstitial void volume has a weight less than the weight of the at least one dielectric property-enhancing fluid required to saturate the conductor shield and the polymeric insulation jacket.

30. The method according to claim 25, wherein the at least one dielectric property-enhancing fluid is supplied at a pressure greater than about 50 psig for more than about 2 hours before being confined within in the interstitial void volume.

31. The method according to claim 25, wherein the pressure used in injecting the interstitial void volume is greater than the residual pressure.

32. The method according to claim 25, wherein the residual pressure is about 100 psig to about 1000 psig.

33. The method according to claim 32, wherein the residual pressure is about 300 psig to about 600 psig.

34. A method for enhancing the dielectric properties of an electrical cable segment between first and second connectors, the cable segment having a central stranded conductor encased in a polymeric insulation jacket and having an interstitial void volume in the region of the conductor, the method comprising:

selecting an anticipated operating temperature profile for the cable segment to be used in selecting at least one dielectric property-enhancing fluid to be injected into the interstitial void volume of the cable segment;

selecting a minimum desired time period to be used in selecting the at least one dielectric property-enhancing fluid to be injected into the interstitial void volume of the cable segment during which the dielectric properties of the cable segment are to be enhanced by the mixture;

selecting the at least one dielectric property-enhancing fluid to provide the cable segment with a reliable life spanning at least the minimum desired time period for the selected operating temperature profile;

filling through at least one of the first and second connectors the interstitial void volume along the entire length of the cable segment with the at least one dielectric property-enhancing fluid at a pressure below the elastic limit of the polymeric insulation jacket; and confining with the first and second connectors the at least one dielectric property-enhancing fluid within the interstitial void volume at a residual pressure selected to promote the transport of the at least one dielectric property-enhancing fluid into the polymeric insulation jacket, with the residual pressure being imposed along the entire length of the cable segment and being below the elastic limit.

35. The method according to claim 34, wherein the residual pressure at which the at least one dielectric property-enhancing fluid is confined within the interstitial void volume is sufficient to expand the interstitial void volume along the entire length of the cable segment by at least 5%, but below an elastic limit of the polymeric insulation jacket.

36. The method according to claim 34, wherein the filling and confining of the at least one dielectric property-enhancing fluid within the interstitial void volume includes:

attaching the first connector to a first terminus of the cable segment;

attaching the second connector to a second terminus of the cable segment, each of the first and second connectors providing fluid communication to the interstitial void volume;

opening both of the first and second connectors and introducing the at least one dielectric property-enhancing fluid via the first connector so as to fill the interstitial void volume;

closing the second connector and introducing an additional quantity of the at least one dielectric property-enhancing fluid via the first connector at a pressure greater than about 50 psig, but less than an elastic limit of the polymeric insulation jacket; and closing the first connector so as to contain the at least one dielectric property-enhancing fluid within the interstitial void volume at a residual pressure greater than about 50 psig, but below the elastic limit.

37. The method according to claim 34, wherein selecting the at least one dielectric property-enhancing fluid includes selecting at least first and second components for a mixture to be injected into the interstitial void volume of the cable segment, with the first component for the mixture to provide the cable segment with a reliable life spanning a first time period for the selected operating temperature profile, and the second component for the mixture to provide the cable segment with a reliable life spanning a second time period at least in part extending beyond the first time period for the selected operating temperature profile.

38. The method according to claim 34, wherein selecting the at least one dielectric property-enhancing fluid further includes selecting a third component for the mixture to be injected into the interstitial void volume of the cable segment, with the third component for the mixture to provide the cable segment with a reliable life spanning a third time period at least in part extending beyond the second time period and beyond the minimum desired time period for the selected operating temperature profile and with the third component being a combination of at least two constituent components, each to provide the cable segment with a reliable life spanning at least a portion of the third time period for the selected operating temperature profile.

39. The method according to claim 34, wherein the selected operating temperature profile is selected at least in part based on the anticipated fluctuations over time of the difference between the anticipated operating temperature of the central conductor and the anticipated temperature of an outer portion of the polymeric insulation jacket during operation of the central conductor during at least a portion of the minimum desired time period.

40. The method according to claim 34 for use with a cable segment where the central stranded conductor is surrounded by a conductor shield, wherein the at least one dielectric property-enhancing fluid filling the interstitial void volume saturates the conductor shield and the polymeric insulation jacket with the at least one dielectric property-enhancing fluid, and wherein the at least one dielectric property-enhancing fluid contained within the interstitial void volume has a weight less than the weight of the at least one dielectric property-enhancing fluid required to saturate the conductor shield and the polymeric insulation jacket.

41. The method according to claim 34, wherein the at least one dielectric property-enhancing fluid is supplied at a pressure greater than about 50 psig for more than about 2 hours before being confined within in the interstitial void volume.

42. The method according to claim 34, wherein the pressure used in filling the interstitial void volume is greater than the residual pressure.

43. The method according to claim 34, wherein the residual pressure is about 100 psig to about 1000 psig.

44. The method according to claim 43, wherein the residual pressure is about 300 psig to about 600 psig.

* * * * *

UNITED STATES PATENT AND TRADEMARK OFFICE
CERTIFICATE OF CORRECTION

PATENT NO.       : 7,611,748 B2
APPLICATION NO.  : 11/070390
DATED            : November 3, 2009
INVENTOR(S)      : Glen John Bertini It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,611,748 B2  Page 1 of 1
APPLICATION NO. : 11/070390
DATED : November 3, 2009
INVENTOR(S) : Glen John Bertini It is certified that error appears in the above-identified patent and that said Letters Patent is hereby corrected as shown below:

Column 7, line 47 should read: as follows. A 107 foot length of the above mentioned 1/0
Column 7, line 67 should read: son of the various cable samples. Unexpectedly, the actual
Column 9, line 3 should read: example, while the above mentioned 1/0 cable segment hav-
Column 12, line 8 should read: nectors therebetween operating in a flow-through mode. The
Column 14, line 22 should read: O-ring 88 with the plug-pin extending therethrough, in
Column 21, line 55 should read: treatment for 1000 feet of concentric 1/0, 100% XLPE insu-
Column 26, line 15 should read: incorporated the above described method for treating electrical
Column 27, line 27 should read: nylmethyldimethoxysilane, a Class M material used in the
Column 29, line 36 should read: an alkoxysilane to make an efficacious stress grading and
Column 31, line 24 should read: change in conductor temperature, and ΔT is between
Column 31, line 45 should read: rials to Class M materials without regard to the circuit owner's
Column 31, line 67 should read: particular cable between the four categories outlined above and
Column 32, line 12 should read: the circuit owner's desires. The present method for selecting
Column 32, line 53 should read: owner's desires, the present method for selecting formulations
Column 47, line 18 claim 37 should read: The method according to claim 37, wherein selecting Signed and Sealed this
Twenty-second Day of March, 2011

David J. Kappos
*Director of the United States Patent and Trademark Office*